United States Patent
Shi et al.

(10) Patent No.: US 10,638,282 B2
(45) Date of Patent: Apr. 28, 2020

(54) CHARGING SYSTEM AND METHOD, AND NETWORK DEVICE

(71) Applicant: HUAWEI TECHNOLOGIES CO., LTD., Shenzhen, Guangdong (CN)

(72) Inventors: Xiaoli Shi, Shanghai (CN); Hongzhuo Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/306,853

(22) PCT Filed: May 11, 2016

(86) PCT No.: PCT/CN2016/081743
§ 371 (c)(1),
(2) Date: Dec. 3, 2018

(87) PCT Pub. No.: WO2017/113562
PCT Pub. Date: Jul. 6, 2017

(65) Prior Publication Data
US 2019/0208380 A1    Jul. 4, 2019

(30) Foreign Application Priority Data
Dec. 31, 2015 (WO) ................ PCT/CN2015/100318

(51) Int. Cl.
*H04W 4/24* (2018.01)
*H04W 28/02* (2009.01)
(Continued)

(52) U.S. Cl.
CPC ........... *H04W 4/24* (2013.01); *H04L 12/1407* (2013.01); *H04M 15/58* (2013.01); *H04M 15/66* (2013.01); *H04M 15/67* (2013.01); *H04W 28/02* (2013.01)

(58) Field of Classification Search
CPC ....... H04W 4/24; H04W 28/02; H04M 15/58; H04M 15/67; H04M 15/66; H04L 12/1407
See application file for complete search history.

(56) References Cited

U.S. PATENT DOCUMENTS

2013/0053027 A1   2/2013  Lau et al.
2015/0074761 A1   3/2015  Zhu et al.
(Continued)

FOREIGN PATENT DOCUMENTS

| CN | 101247238 A | 8/2008 |
| CN | 102036332 A | 4/2011 |

(Continued)

OTHER PUBLICATIONS

S2-141652 Ericsson et al.,"Traffic steering for RAN-based WLAN interworking solution",SA WG2 Meeting #103,May 19-23, 2014, Phoenix, Arizona, USA,total 25 pages.
(Continued)

*Primary Examiner* — Brandon J Miller
(74) *Attorney, Agent, or Firm* — Paul Hashim

(57) ABSTRACT

A charging system, method and network device are provided. A first access device performs traffic statistics collection on a service of a user terminal transferred by a second access device, and sends a traffic indication message to a core network entity. The traffic indication message includes traffic information of the service that can be used by the core network entity to perform charging on the service.

12 Claims, 17 Drawing Sheets

(51) Int. Cl.
*H04L 12/14* (2006.01)
*H04M 15/00* (2006.01)

(56) References Cited

U.S. PATENT DOCUMENTS

| 2015/0133081 | A1 | 5/2015 | Griot et al. |
| 2015/0139184 | A1 | 5/2015 | Wang et al. |
| 2015/0264621 | A1* | 9/2015 | Sivanesan ......... H04W 36/0069 455/436 |
| 2016/0044567 | A1 | 2/2016 | Baghel et al. |
| 2016/0183273 | A1 | 6/2016 | Rommer et al. |
| 2016/0249210 | A1 | 8/2016 | Chang et al. |
| 2016/0309373 | A1* | 10/2016 | Khawer ................... H04W 4/24 |
| 2016/0330669 | A1 | 11/2016 | Li et al. |
| 2017/0187886 | A1* | 6/2017 | Rashid ................. H04L 12/1407 |
| 2018/0262930 | A1* | 9/2018 | da Silva ................ H04W 24/08 |

FOREIGN PATENT DOCUMENTS

| CN | 102572973 A | 7/2012 |
| CN | 102740416 A | 10/2012 |
| CN | 103428664 A | 12/2013 |
| CN | 103491519 A | 1/2014 |
| CN | 103582011 A | 2/2014 |
| CN | 103959829 A | 7/2014 |
| CN | 103988543 A | 8/2014 |
| CN | 105103605 A | 11/2015 |
| RU | 2012146348 A | 5/2014 |
| WO | 2015069173 A1 | 5/2015 |
| WO | 2015106460 A1 | 7/2015 |
| WO | 2017030487 A1 | 2/2017 |

OTHER PUBLICATIONS

S2-141917 Alcatel-Lucent et al.,"Introduction of traffic steering for RAN-based WLAN interworking solution",SA WG2 Meeting #103, May 19-23, 2014, Phoenix, Arizona, USA,total 19 pages.

3GPP TS 36.413 V13.1.0 (Dec. 2015),3rd Generation Partnership Project;Technical Specification Group Radio Access Network;Evolved Universal Terrestrial Radio Access Network(E-UTRAN);S1 Application Protocol (S1AP)(Release 13), total 314 pages.

3GPP TS 23.401 V135.0 (Dec. 2015),3rd Generation Partnership Project;Technical Specification Group Services and System Aspects;General Packet Radio Service (GPRS) enhancements for Evolved Universal Terrestrial Radio Access Network (E-UTRAN) access(Release 13),dated Dec. 15, 2015,total 337 pages.

3GPP TS 23.203 V13.6.0 (Dec. 2015),3rd Generation Partnership Project;Technical Specification Group Services and System Aspects;Policy and charging control architecture(Release 13),dated Dec. 15, 2015,total 242 pages.

* cited by examiner

CHARGING SYSTEM AND METHOD, AND NETWORK DEVICE

CROSS-REFERENCE TO RELATED APPLICATIONS

This application is a national stage filing of International Application No. PCT/CN2016/081743 filed on May 11, 2016, which claims priority to PCT Application No. PCT/CN2015/100318, filed on Dec. 31, 2015, both of which applications are hereby incorporated by reference in their entireties.

TECHNICAL FIELD

The present disclosure relates to the field of communications technologies, and in particular, to a charging system and method, and a network device.

BACKGROUND

A basic consensus about a future evolved radio access technology in the current industry is that there is no core network and there is no higher layer protocol stack in the future evolved radio access technology. For example, there is no non-access stratum (NAS), radio resource control (RRC) layer, or Internet Protocol (IP) layer, and there is only a layer 1/layer 2 (L1/L2). An air interface technology used in the future evolved radio access technology may be specifically, for example, a filter band multicarrier (FBMC) technology, a faster than Nyquist (FTN) technology, a generalized frequency division multiplexing (GFDM) technology, or a non-orthogonal multiple access (NOMA) technology, and these technologies are temporarily and collectively referred to as future evolved air interface access technologies.

Currently, because different radio access technologies are configured with respective core networks, when a terminal accesses radio networks of different standards, a corresponding core network performs charging on a service carried through the radio network.

In the future evolved radio access technology, when data is transferred by using a corresponding air interface technology, because the future evolved radio access technology communication system does not include a core network, how to perform charging on a service carried by using the future evolved radio technology is an urgent problem to be resolved.

SUMMARY

Embodiments of the present disclosure provide a charging system and method, and a network device, to resolve a problem that when a core network is not provided in a future evolved radio access technology, charging cannot be performed on a service carried by using the future evolved radio technology.

According to a first aspect, a charging system is provided. The charging system includes:

a first access device in a first radio network, configured to: determine that a service carried by a user terminal is a service transferred by using a second radio access technology, and send, to a mobility management entity in the first radio network, a first message that carries a first indication;

the mobility management entity in the first radio network, configured to: receive the first message sent by the first access device or a second access device when the first access device or the second access device determines that the service carried by the user terminal is a service transferred by using the second radio access technology, and when determining that the first message carries the first indication, add the first indication to a second message, and send the second message to a core network gateway in the first radio network; and the core network gateway in the first radio network, configured to: receive the second message sent by the mobility management entity in the first radio network, and when determining that the second message carries the first indication, perform charging on a service that is sent to the second access device, carried by the user terminal, and transferred by using the second radio access technology; where the first indication is used to indicate that the service carried by the user terminal is a service transferred by using the second radio access technology, the second access device is located in a second radio network that uses the second radio access technology, and the first access device and the second access device use different radio access technologies.

According to a second aspect, a charging method is provided. The charging method includes:

determining, by a first access device in a first radio network, that a service carried by a user terminal is a service transferred by using a second radio access technology; and sending, by the first access device to a mobility management entity in the first radio network, a first message that carries a first indication, and sending, to a core network gateway in the first radio network through the mobility management entity, a second message that carries the first indication, where the first indication is used to indicate that the service carried by the user terminal is a service transferred by using the second radio access technology.

In a possible design, the determining, by a first access device, that a service carried by a user terminal is a service transferred by using a second radio access technology may be implemented in the following manner:

when receiving an attach request message sent by the user terminal by using the second radio access technology, determining, by the first access device, that the service carried by the user terminal is a service transferred by using the second radio access technology.

In a possible design, before the first access device receives the attach request message sent by the user terminal by using the second radio access technology, the method further includes:

receiving, by the first access device through a second access device in a second radio network, a radio resource control RRC connection request message sent by the user terminal, and feeding back an RRC connection setup message to the user terminal through the second access device, to complete RRC connection setup of the user terminal, where the second access device is located in the second radio network that uses the second radio access technology, and the first access device and the second access device use different radio access technologies.

When the first access device receives the attach request message sent by the user terminal by using the second radio access technology, the first message may be an initial terminal message, and the second message may be a create session request message.

In this design, the user terminal accesses a core network of the first radio network through the second radio network and transfers a corresponding service by using the second radio access technology. Therefore, the core network of the first radio network may be used to perform charging on the corresponding service transferred by using the second radio access technology.

In a possible design, the determining, by a first access device, that a service carried by a user terminal is a service transferred by using a second radio access technology may be implemented in the following manner:

sending, by the first access device, an addition request message to a second access device when determining to add the second access device to perform data split;

receiving, by the first access device, an addition request acknowledge message fed back by the second access device, where the addition request acknowledge message carries related configuration information of the second access device;

adding, by the first access device, the related configuration information of the second access device to an RRC connection reconfiguration message, and sending the RRC connection reconfiguration message to the user terminal; and after receiving an RRC connection reconfiguration complete message fed back by the user terminal, determining, by the first access device, that the service carried by the user terminal is a service transferred by using the second radio access technology.

In a possible design, before the sending, by the first access device, an addition request message to a second access device when determining to add the second access device to perform data split, the method further includes:

determining, by the first access device, that the user terminal accesses the first radio network through the first access device; or determining, by the first access device, that the user terminal accesses the first radio network through the second access device, and receiving an addition request message sent by the second access device.

When the first access device receives the RRC connection reconfiguration complete message fed back by the user terminal, and determines that the service carried by the user terminal is a service transferred by using the second radio access technology, the first message is a bearer modification indication message, and the second message is a bearer modification request message.

In this design, the user terminal transfers a corresponding service by using the second radio access technology in a dual connectivity scenario of the first radio network and the second radio network. Therefore, the core network of the first radio network may be used to perform charging on the corresponding service transferred by using the second radio access technology.

In a possible design, the determining, by a first access device, that a service carried by a user terminal is a service transferred by using a second radio access technology includes:

after determining that the user terminal is handed over from a third access device that performs data split with a second access device to the first access device, sending, by the first access device, an addition request message to the second access device when determining to continue performing data split through the second access device, where the first access device and the third access device use a same radio access technology;

receiving, by the first access device, an addition request acknowledge message fed back by the second access device, where the addition request acknowledge message includes related configuration information of the second access device;

adding, by the first access device, the related configuration information of the second access device to an RRC connection reconfiguration message, and sending the RRC connection reconfiguration message to the user terminal; and after receiving an RRC connection reconfiguration complete message fed back by the user terminal, determining, by the first access device, that the service carried by the user terminal is a service transferred by using the second radio access technology.

When the first access device receives the RRC connection reconfiguration complete message fed back by the user terminal, and determines that the service carried by the user terminal is a service transferred by using the second radio access technology, the first message is a path switch request message, and the second message is a bearer modification request message or a create session request message.

In this design, the user terminal is handed over from the first access device in the first radio network to the third access device in the first radio network. Because the first access device is performing data split with the second access device in the second network, when the second access device in the second network is enabled to continue the data split process, a corresponding service is transferred by using the second radio access technology. Therefore, the core network of the first radio network may be used to perform charging on the corresponding service transferred by using the second radio access technology.

According to a third aspect, a charging method is provided. The charging method includes:

receiving, by a mobility management entity in a first radio network, a first message sent by a first access device or a second access device when the first access device or the second access device determines that a service carried by a user terminal is a service transferred by using a second radio access technology, where the second access device is located in a second radio network that uses the second radio access technology, and the first access device and the second access device use different radio access technologies; and when determining that the first message carries a first indication, adding, by the mobility management entity, the first indication to a second message, and sending the second message to a core network gateway in the first radio network, where the first indication is used to indicate that the service carried by the user terminal uses the second radio access technology.

When the first message is an initial terminal message, the second message is a create session request message; or when the first message is a bearer modification indication message, the second message is a bearer modification request message; or when the first message is a path switch request message, if the mobility management entity determines that the core network gateway of the user terminal in the first radio network needs to change, the second message is a create session request message; or if the mobility management entity determines that the core network gateway of the user terminal in the first radio network does not need to change, the second message is a bearer modification request message.

According to a fourth aspect, a charging method is provided. The charging method includes:

receiving, by a core network gateway in a first radio network, a second message sent by a mobility management entity in the first radio network; and when determining that the second message carries a first indication, performing, by the core network gateway, charging on a service that is sent to a second access device, carried by a user terminal, and transferred by using a second radio access technology, where the first indication is used to indicate that the service carried by the user terminal is a service transferred by using the second radio access technology.

The second message is a create session request message or a bearer modification request message.

According to a fifth aspect, a network device is provided, and the network device has a function of implementing actual behavior of the first access device in the foregoing method. The function may be implemented by hardware, or may be implemented by hardware by executing corresponding software. The hardware or the software includes one or more modules corresponding to the foregoing function.

In a possible design, a structure of the network device includes a processor, a transceiver, and a communications unit. The processor is configured to support the network device in performing the corresponding function in the foregoing method. The transceiver is configured to support communication between the network device and a user terminal to send information or an instruction in the foregoing method to the user terminal, and the communications unit is configured to support communication between the network device and another network entity to send information or an instruction in the foregoing method to the another network entity. The network device may further include a memory. The memory is configured to be coupled to the processor. The memory stores a program instruction and data required by the network device.

According to a sixth aspect, a network device is provided, and the network device has a function of implementing actual behavior of the mobility management entity in the first radio network in the foregoing method. The network device may be a mobility management entity in a core network. The function may be implemented by hardware, or may be implemented by hardware by executing corresponding software. The hardware or the software includes one or more modules corresponding to the foregoing function.

In a possible design, a structure of the network device includes a processor and a transceiver, and the processor is configured to support the network device in performing the corresponding function in the foregoing method. The transceiver is configured to support communication between the network device and each of a first access device and a core network gateway in a first radio network to send information or an instruction in the foregoing method to the first access device and the core network gateway in the first radio network. The network device may further include a memory. The memory is configured to be coupled to the processor. The memory stores a program instruction and data required by the network device.

According to a seventh aspect, a network device is provided, and the network device has a function of implementing actual behavior of the core network gateway in the first radio network in the foregoing method. The network device may be a core network gateway in a core network. The function may be implemented by hardware, or may be implemented by hardware by executing corresponding software. The hardware or the software includes one or more modules corresponding to the foregoing function.

In a possible design, a structure of the network device includes a processor and a transceiver, and the processor is configured to support the network device in performing the corresponding function in the foregoing method. The transceiver is configured to support communication between the network device and a mobility management entity in a first radio network to send information or an instruction in the foregoing method to the mobility management entity. The network device may further include a memory. The memory is configured to be coupled to the processor. The memory stores a program instruction and data required by the network device.

According to an eighth aspect, a computer storage medium is provided, the computer storage medium is configured to store a computer software instruction used by the foregoing first access device, and the computer software instruction includes a program designed to perform the foregoing aspects.

According to a ninth aspect, a computer storage medium is provided, the computer storage medium is configured to store a computer software instruction used by the foregoing mobility management entity in the first radio network, and the computer software instruction includes a program designed to perform the foregoing aspects.

According to a tenth aspect, a computer storage medium is provided, the computer storage medium is configured to store a computer software instruction used by the foregoing core network gateway in the first radio network, and the computer software instruction includes a program designed to perform the foregoing aspects.

In comparison with the currently references, in the solutions provided in the present disclosure, a charging function for a service that is carried by the terminal and that is transferred by using the second radio technology can be implemented by the core network gateway in the first radio network. The method is simple in implementation and is easy to promote.

DESCRIPTION OF EMBODIMENTS

A 5G communications system is used as an example. There is no core network and there is no higher layer protocol stack in 5G In an implementation solution, a communication of the 5G system is implemented by using an LTE-5G dual connectivity (DC) technology. LTE-5G-DC means that user equipment (UE) accesses a network via a Long Term Evolution (LTE) system, a control plane (CP) in the LTE system is reserved, and then user plane (UP) data is transferred through both an LTE air interface and an air interface of a 5G base station, that is, the user plane is anchored at an LTE Packet Data Convergence Protocol (PDCP) layer to perform data split at per data packet or per bearer. Correspondingly, network architecture in an LTE-5G-DC scenario may be an architecture shown in FIG. 1 or FIG. 2, and a mobility management entity (MME) and a serving gateway (SGW) are network elements of an LTE core network. In the embodiments of this application, an air interface technology used by the 5G base station is referred to as a 5G air interface for short. For convenience, another naming manner may also be used, and this is not specifically limited.

Figure 1:
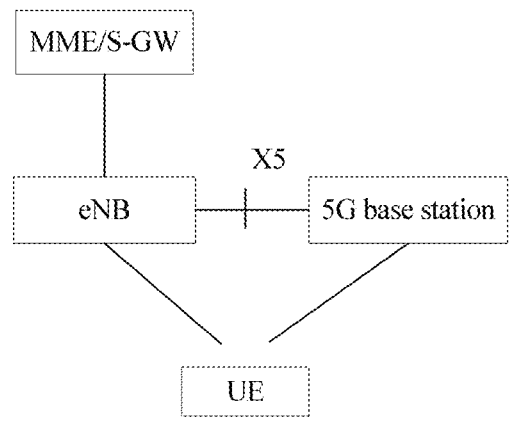
FIG. 1 is a schematic diagram of physical networking in an LTE-5G dual connectivity scenario.

It can be learned from an architectural diagram shown in FIG. 1 that UE accesses an eNB through a 5G base station by using an X5 interface, and is further connected to an LTE core network. It can be obtained from an architectural diagram shown in FIG. 2 that UE directly access an LTE core network through a 5G base station by using an Sx interface, and there is a higher layer such as a PDCP/RRC layer in LTE. The X5 interface is a newly defined interface between an LTE eNB and the 5G base station, and the Sx interface is a newly defined interface between an LTE MME and the 5G base station. The X5 interface and the Sx interface may use other names to represent interfaces between corresponding network elements. An interface name is not specifically limited.

Figure 2:
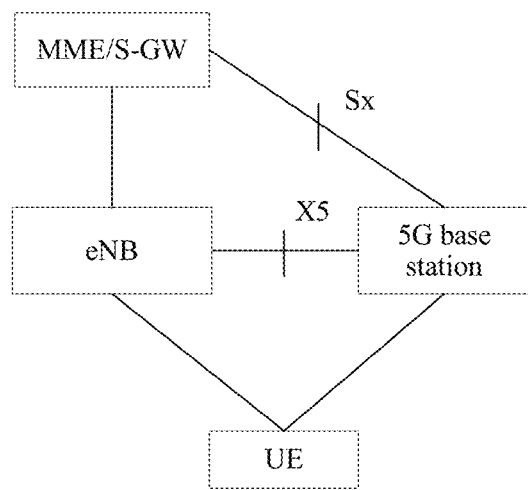
FIG. 2 is another schematic diagram of physical networking in an LTE-5G dual connectivity scenario.
Figure 3:
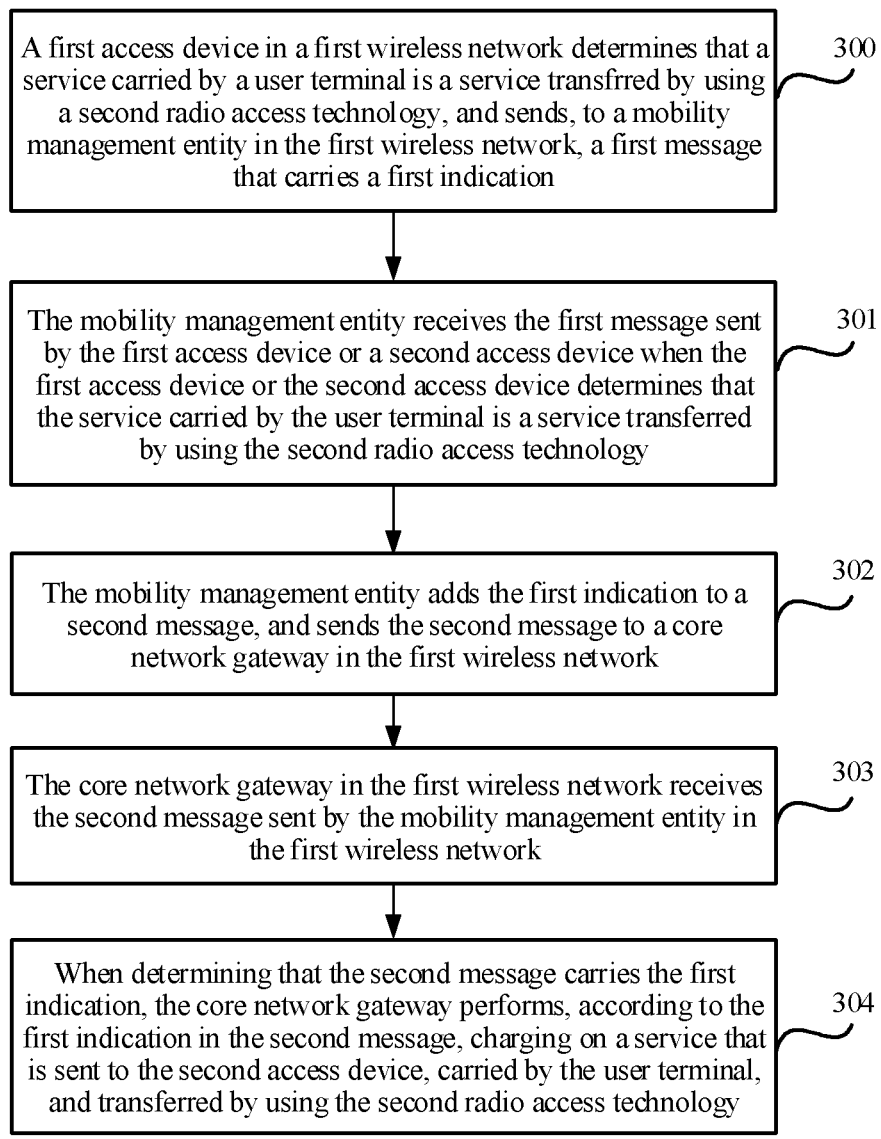
FIG. 3 is a flowchart of a charging method according to an embodiment of the present disclosure.

Based on the network architecture shown in FIG. 1 or FIG. 2, as shown in FIG. 3, an embodiment of the present disclosure provides a charging method for air interface transmission in a future evolved radio access technology. A specific procedure is as follows:

Block 300: A first access device in a first radio network determines that a service carried by a user terminal is a service transferred by using a second radio access technology, and sends, to a mobility management entity in the first radio network, a first message that carries a first indication.

The second radio access technology is an air interface access technology used by a second radio network, and the first indication is used to indicate that the service carried by the user terminal is a service transferred by using the second radio access technology.

Optionally, block 300 may be: a second access device in a second radio network determines that a service carried by a user terminal is a service transferred by using a second radio access technology, and sends, to a mobility management entity in a first radio network, a first message that carries a first indication.

For example, the first access device is the LTE eNB in FIG. 1 or FIG. 2, and the second access device is the 5G base station in FIG. 1 or FIG. 2.

The first message may be any one of an initial terminal message, a bearer modification indication message, or a path switch request message.

The first access device and the second access device use different radio access technologies, and the first access device may be a base station in the first radio network, or another network device of an access network side in the first radio network. The second access device is a base station in the second radio network, or another network device of an access network side in the second radio network. For example, the first access device is a base station of an LTE standard, and the second access device is a base station of a 5G standard.

Block 301: The mobility management entity receives the first message sent by the first access device or a second access device when the first access device or the second access device determines that the service carried by the user terminal is a service transferred by using the second radio access technology.

Block 302: The mobility management entity adds the first indication into a second message, and sends the second message to a core network gateway in the first radio network.

Optionally, the second message may be either a create session request message or a bearer modification indication message.

Block 303: The core network gateway in the first radio network receives the second message sent by the mobility management entity in the first radio network.

Block 304: When determining that the second message carries the first indication, the core network gateway performs, according to the first indication in the second message, charging on a service that is sent to the second access device, carried by the user terminal, and transferred by using the second radio access technology.

Figure 4:
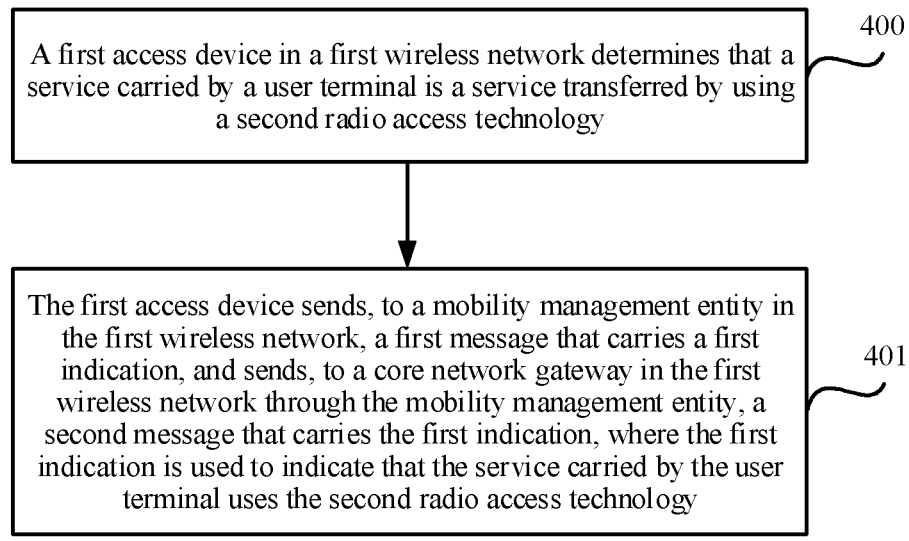
FIG. 4 is a flowchart of a charging method on an access network side of a first radio network according to an embodiment of the present disclosure.

As shown in FIG. 4, an embodiment of the present disclosure further provides a flowchart of a charging method. In FIG. 4, the charging method may be performed by a base station in a first radio network, or another network device of an access network side in a first radio network. It should be noted that mutual reference may be made between charging methods in the embodiments in FIG. 4, FIG. 5, and FIG. 6.

As shown in FIG. 4, the method includes the following blocks:

Block 400: A first access device in a first radio network determines that a service carried by a user terminal is a service transferred by using a second radio access technology.

Block 401: The first access device sends, to a mobility management entity in the first radio network, a first message that carries a first indication, and sends, to a core network gateway in the first radio network through the mobility management entity, a second message that carries the first indication, where the first indication is used to indicate that the service carried by the user terminal uses the second radio access technology.

Specifically, a first access device determines that a service carried by a user terminal is a service transferred by using a second radio access technology includes the following three cases:

In a first case, when receiving an attach request message sent by the user terminal by using the second radio access technology, the first access device determines that the service carried by the user terminal is a service transferred by using the second radio access technology.

In the first case, the user terminal accesses a core network of the first radio network through a second radio network, and transfers a corresponding service by using the second radio access technology.

In the first case, before receiving the attach request message sent by the user terminal by using the second radio access technology, the first access device performs the following operation:

receiving, through a second access device in a second radio network, a radio resource control (RRC) connection request message sent by the user terminal, and feeding back an RRC connection setup message to the user terminal through the second access device, to complete RRC connection setup of the user terminal.

In the first case, when the first access device receives the attach request message sent by the user terminal by using the second radio access technology, the first message is an initial terminal message, and the second message is a create session request message.

In a second case, the first access device sends an addition request message to a second access device when determining to add the second access device to perform data split, and receives an addition request acknowledge message fed back by the second access device. The addition request acknowledge message carries related configuration information of the second access device, and the configuration information is used to enable the terminal to successfully access the second access device. For example, the configuration information includes a security algorithm, a random access pilot code, an access parameter, and system information of the second access device. Then, the first access device adds the related configuration information of the second access device into an RRC connection reconfiguration message, and sends the RRC connection reconfiguration message to the user terminal. After receiving an RRC connection reconfiguration complete message fed back by the user terminal, the first access device determines that the service carried by the user terminal is a service transferred by using the second radio access technology.

In the second case, the user terminal transfers a corresponding service by using the second radio access technology in a dual connectivity scenario of the first radio network and the second radio network.

In a third case, after determining that the user terminal is handed over from a third access device that performs data split with a second access device to the first access device, the first access device sends an addition request message to the second access device when determining to continue performing data split through the second access device, where the first access device and the third access device use a same radio access technology. The first access device receives an addition request acknowledge message fed back by the second access device, where the addition request acknowledge message carries related configuration information of the second access device. The first access device adds the related configuration information of the second access device into an RRC connection reconfiguration message, and sends the RRC connection reconfiguration message to the user terminal. After receiving an RRC connection reconfiguration complete message fed back by the user terminal, the first access device determines that the service carried by the user terminal is a service transferred by using the second radio access technology. The second access device is located in a second radio network that uses the second radio access technology, and the first access device and the second access device use different radio access technologies.

In the second case, before the first access device sends the addition request message to the second access device when determining to add the second access device to perform data split, the first access device further performs the following operation:

determining that the user terminal directly and successfully accesses the first radio network through the first access device; or determining that the user terminal successfully accesses the first radio network through the second access device, and receiving an addition request message sent by the second access device.

In the second case, when the first access device receives the RRC connection reconfiguration complete message fed back by the user terminal, and determines that the service carried by the user terminal is a service transferred by using the second radio access technology, the first message is a bearer modification indication message, and the second message is a bearer modification request message.

In the third case, the user terminal is handed over from the first access device in the first radio network to the third access device in the first radio network. Because the first access device is performing data split with the second access device in the second network, when the second access device in the second network is enabled to continue the data split process, a corresponding service is transferred by using the second radio access technology.

In the third case, when the first access device receives the RRC connection reconfiguration complete message fed back by the user terminal, and determines that the service carried by the user terminal is a service transferred by using the second radio access technology, the first message is a path switch request message, and the second message is a bearer modification request message or a create session request message.

Figure 5:
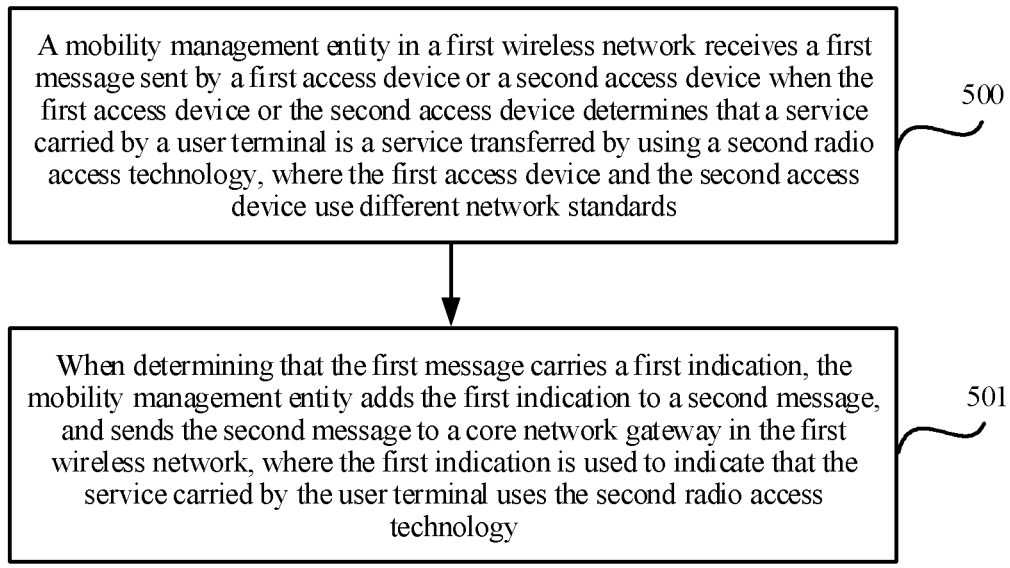
FIG. 5 is a flowchart of a charging method on a mobility management entity side of a first radio network according to an embodiment of the present disclosure.

As shown in FIG. 5, an embodiment of the present disclosure further provides a flowchart of a charging method. In FIG. 5, the charging method may be performed by a mobility management entity in a first radio network.

As shown in FIG. 5, the method includes the following blocks.

Block 500: A mobility management entity in a first radio network receives a first message sent by a first access device or a second access device when the first access device or the second access device determines that a service carried by a user terminal is a service transferred by using a second radio access technology respectively, where the first access device and the second access device use different network standards.

Block 501: When determining that the first message carries a first indication, the mobility management entity adds the first indication into a second message, and sends the second message to a core network gateway in the first radio network, where the first indication is used to indicate that the service carried by the user terminal uses the second radio access technology.

Optionally, when the first message is an initial terminal message, the second message is a create session request message; when the first message is a bearer modification indication message, the second message is a bearer modification request message; and when the first message is a path switch request message, if the mobility management entity determines that the core network gateway of the user terminal in the first radio network needs to change, the second message is a create session request message; or if the mobility management entity determines that the core network gateway of the user terminal in the first radio network does not need to change, the second message is a bearer modification request message.

Figure 6:
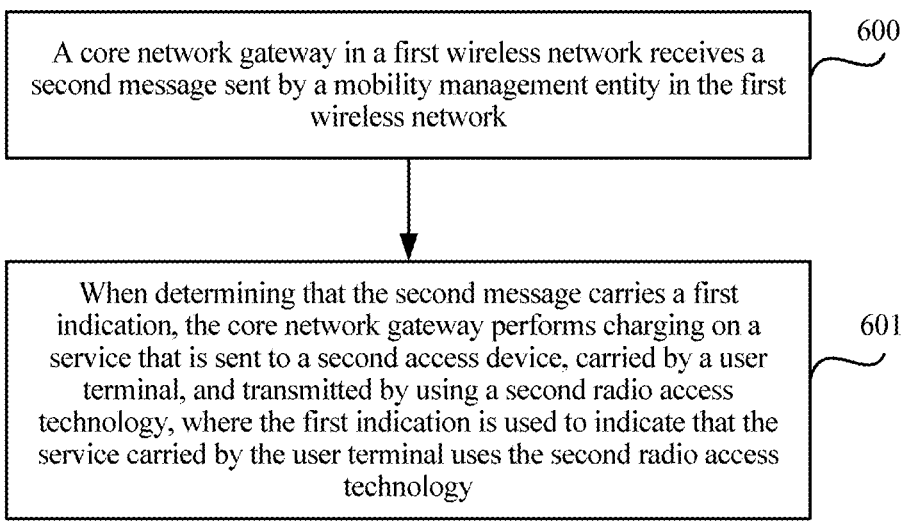
FIG. 6 is a flowchart of a charging method on a core network side of a first radio network according to an embodiment of the present disclosure.

As shown in FIG. 6, an embodiment of the present disclosure further provides a flowchart of a charging method. In FIG. 6, the charging method may be performed by a core network gateway in a first radio network.

As shown in FIG. 6, the method includes the following blocks.

Block 600: A core network gateway in a first radio network receives a second message sent by a mobility management entity in the first radio network.

Block 601: When determining that the second message carries a first indication, the core network gateway performs charging on a service that is sent to a second access device, carried by a user terminal, and transferred by using a second radio access technology, where the first indication is used to indicate that the service carried by the user terminal uses the second radio access technology.

Optionally, the second message is a create session request message or a bearer modification request message.

For example, the first radio network is an LTE network, and the second radio network is a next generation mobile communications network, for example, a fifth generation mobile communications system (The 5th Generation, 5G). The following three embodiments are used to describe in detail an application scenario of the method in FIG. 3. An air interface technology used in 5G is referred to as a 5G air interface for short. There is no core network in 5G; but a user plane is anchored at an LTE PDCP layer to perform data split at per data packet or per bearer. Therefore, only an LTE core network can be used to perform charging on a service transferred by using a 5G access technology.

Figure 7A:
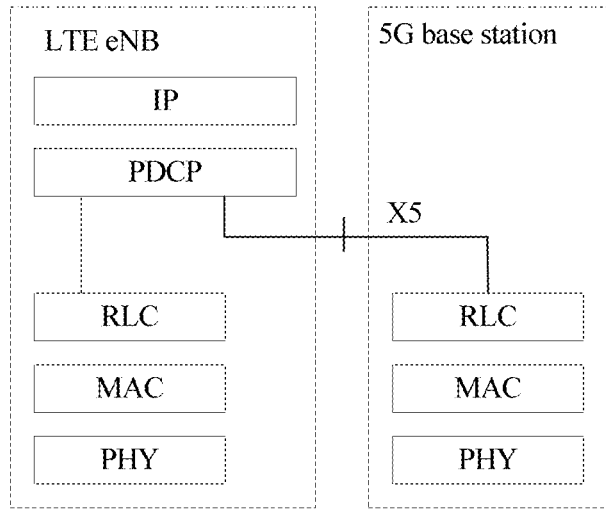
FIG. 7A is a schematic diagram of user plane protocol stacks of an LTE eNB and a 5G base station according to an embodiment of the present disclosure.
Figure 7B:
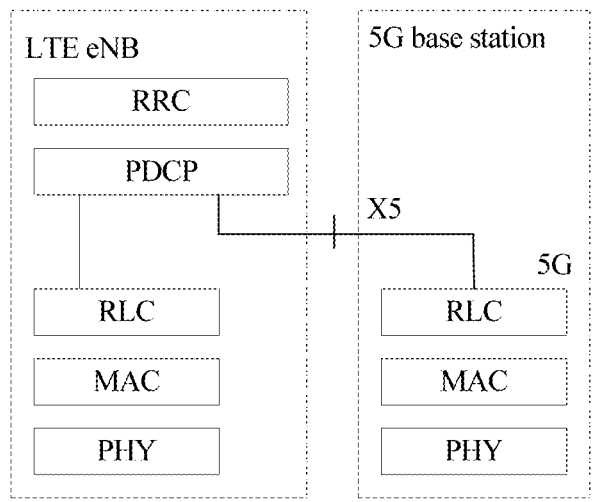
FIG. 7B is a schematic diagram of control plane protocol stacks of an LTE eNB and a 5G base station according to an embodiment of the present disclosure.
Figure 7C:
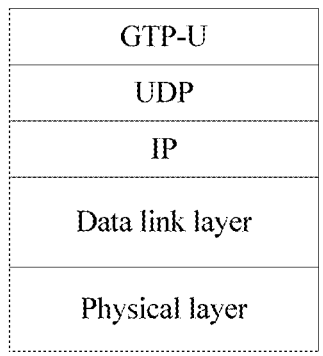
FIG. 7C is a schematic diagram of a user plane protocol stack of an X5 interface between an LTE eNB and a 5G base station according to an embodiment of the present disclosure.
Figure 7D:
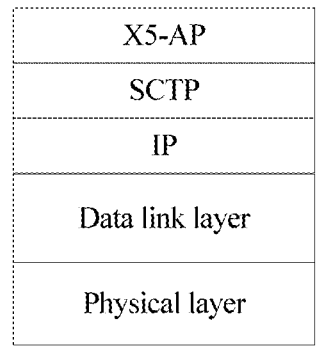
FIG. 7D is a schematic diagram of a user plane protocol stack of an X5 interface between an LTE eNB and a 5G base station according to an embodiment of the present disclosure.

In the architecture in FIG. 1 or FIG. 2, a 5G CP/UP plane is anchored at the LTE PDCP layer. There is an RLC/MAC/PHY layer in 5G To be specific, after the CP plane passes the LTE PDCP layer, CP plane data is sent to UE through the RLC/MAC/PHY layer of the 5G air interface, and after the UP plane passes the LTE PDCP layer, UP plane data is sent to the UE through the RLC/MAC/PHY layer of the 5G air interface. User plane protocol stacks and control plane protocol stacks of an LTE eNB and a 5G base station are respectively shown in FIG. 7A and FIG. 7B. An X5 interface is a new interface between the LTE eNB and the 5G base station, and the X5 interface is a newly defined interface. A user plane protocol stack of the X5 interface is shown in FIG. 7C, and a control plane protocol stack of the X5 interface is shown in FIG. 7D.

Embodiment 1

Figure 8:
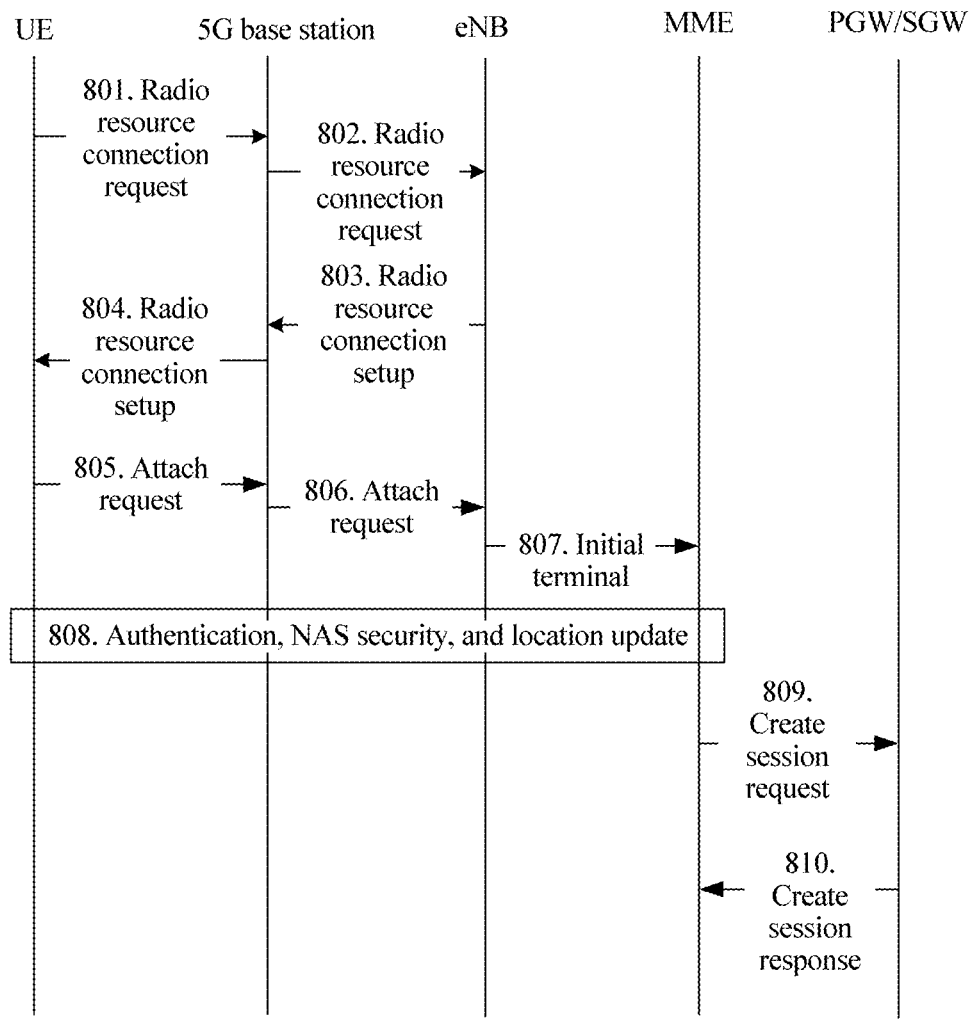
FIG. 8 is a flowchart of a charging method according to Embodiment 1 of the present disclosure.

An application scenario in Embodiment 1 is used to resolve a charging problem caused when a user terminal accesses a 5G base station only through a 5G network. FIG. 1 or FIG. 2 is a network architectural diagram of the application scenario. Network elements in the application scenario include UE, a 5G base station, and an eNB, namely, an LTE eNB, an MME, and a core network gateway in an LTE network. The gateway in a LTE core network includes a packet gateway (PGW) and a serving gateway (SGW). For a specific procedure, refer to FIG. 8.

In block 801 to block 806, the UE initiates radio resource control (RRC) connection setup to the LTE eNB through the 5G base station, and accesses an LTE core network through the LTE eNB. Details are as follows.

Block 801: The UE sends a radio resource connection request message to the 5G base station.

Specifically, the radio resource connection request message may be an RRC connection request message in an LTE format, for example, an RRC connection request message, or may be an RRC connection request message adapting another defined format.

Block 802: The 5G base station forwards the radio resource connection request message of the UE to the LTE eNB.

Block 803: The LTE eNB sends a radio resource connection setup message to the 5G base station by using an X5 interface.

Specifically, the X5 interface is an interface between the LTE eNB and the 5G base station, and the radio resource connection setup message may be an RRC connection setup message. Specifically, the RRC connection setup message may be an RRC connection setup message in an LTE format, for example, an RRC connection setup message, or may be an RRC connection setup message adapting another defined format.

Block 804: The 5G base station forwards the radio resource connection setup message of the LTE eNB to the UE.

Block 805: The UE sends an attach request message to the 5G base station.

Specifically, the attach request message may be an attach request message in an LTE format, for example, an attach request message, or may be an attach request message adapting another defined format. The message is included in an RRC connection setup complete message, and the RRC connection setup complete message may be an RRC connection setup complete message in an LTE format, or may be an RRC connection setup complete message adapting another defined format.

Block 806: After receiving the attach request message of the UE, the 5G base station forwards the attach request message of the UE to the LTE eNB by using an interface between the 5G base station and the LTE eNB, that is, the X5 interface.

Block 807: The LTE eNB sends an initial terminal message (initial UE message) to the MME, where the attach request message is carried in the initial UE message, the initial UE message carries a first indication, and the first indication is used to indicate that a service carried by the UE is a service transferred by using a 5G air interface.

Block 808: After receiving the initial terminal message, the MME performs an authentication process, a non-access-stratum (NAS) security process, and an update location process with the UE.

Authentication process: The authentication process is a process in which the MME obtains an authentication vector (four-tuple) from a home subscriber server (HSS) subscribed by a user, and completes authentication between a network and the UE with the UE.

NAS security process: The NAS security process is a process of establishing an encryption context and an integrity protection context between the UE and the MME. After this process, encryption and integrity protection are performed on a NAS message between the MME and the UE to ensure signaling transmission security.

Update location process: After the authentication process and the security process, the UE is allowed to access a network. In this case, the MME needs to register location information of the UE with the HSS, particularly an MME ID. This process is referred to as the update location process. The update location process is a process of interaction between the MME and the HSS using the Diameter protocol and an S6a interface.

In block 809 and block 810, after security authentication ends, the MME initiates a session creation process to the SGW. Each node in the network creates a bearer context for the UE, and creates a resource process for data forwarding of user plane data. Details are as follows.

Block 809: The MME sends a create session request message to the SGW, where the create session request message carries the first indication.

Optionally, after the SGW receives the create session request message, the SGW sends the create session request message to the PGW.

Block 810: After receiving the create session request message that carries the first indication, the SGW returns a create session response message to the MME to complete a session creation process.

Optionally, after the PGW receives the create session request message, the PGW sends the create session response message to the SGW.

Specifically, the SGW/PGW may perform, according to the first indication in the create session request message, charging on the service transferred by using the 5G air interface.

In the foregoing Embodiment 1, when the UE accesses the LTE core network through the 5G base station, the UE sends, to the MME through the LTE eNB, the initial terminal message that carries the first indication. After receiving the initial terminal message that carries the first indication, the MME adds the first indication to the create session request message, and sends the create session request message to the gateway in the LTE core network, so that the gateway in the LTE core network completes, according to the first indication, charging on a service that is carried by the terminal and that is transferred by using the 5G air interface.

Figure 9:
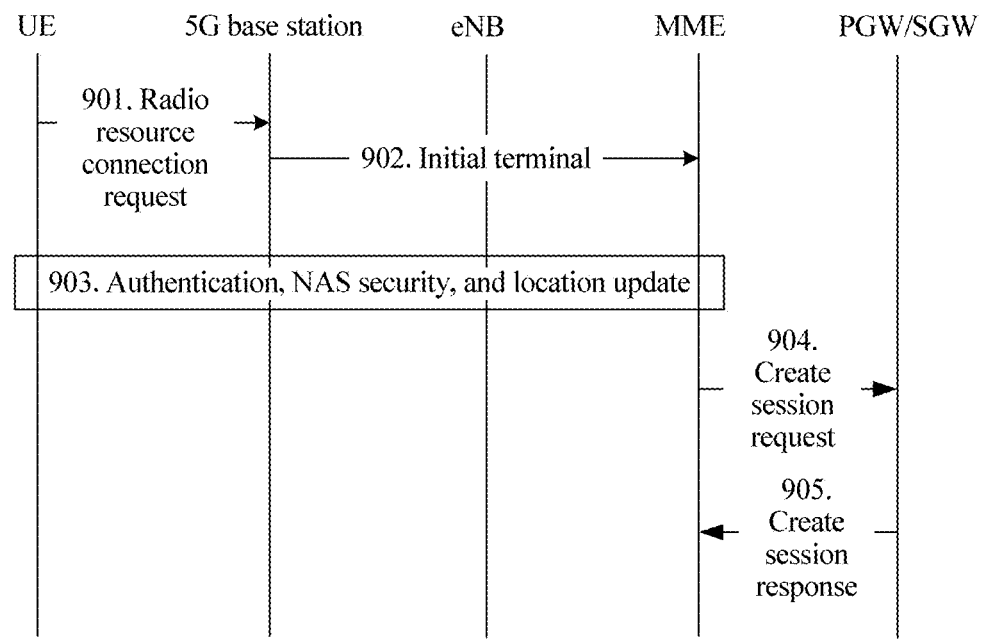
FIG. 9 is a flowchart of another charging method according to Embodiment 1 of the present disclosure.

Optionally, in the network architecture shown in FIG. 2, after the UE sends an RRC connection request message in an LTE format to the 5G base station, if there is an Sx interface between the 5G base station and the LTE MME, and the Sx interface is a newly defined interface between the 5G base station and the LTE MME, the 5G base station may directly send an initial terminal message to the MME by using the Sx interface. The initial terminal message carries an LTE indication, and the initial terminal message does not need to be forwarded by the LTE eNB in this case. Other subsequent Blocks are consistent with Block 808 to Block 810 in FIG. 8 in Embodiment 1. For a specific procedure, refer to FIG. 9.

Block 901: The UE sends a radio resource connection request message to the 5G base station.

Block 902: The 5G base station sends an initial terminal message to the MME.

Block 903: After receiving the initial terminal message, the MME performs an authentication process, a NAS security process, and an update location process with the UE.

Block 904: The MME sends a create session request message to the SGW, where the create session request message carries a first indication.

Block 905: After receiving the create session request message that carries the first indication, the SGW returns a create session response message to the MME to complete a session creation process.

Embodiment 2

An application scenario in Embodiment 2 is used to resolve a problem of charging performed by a user terminal on a service transferred by using a 5G air interface in a dual connectivity scenario of an LTE eNB and a 5G base station. FIG. 1 or FIG. 2 is a network architectural diagram of the application scenario. Network elements in the application scenario include UE, a 5G base station, and an eNB, an MME, and a core network gateway in an LTE network, and the gateway in the LTE core network includes a PGW and an SGW.

Figure 10:
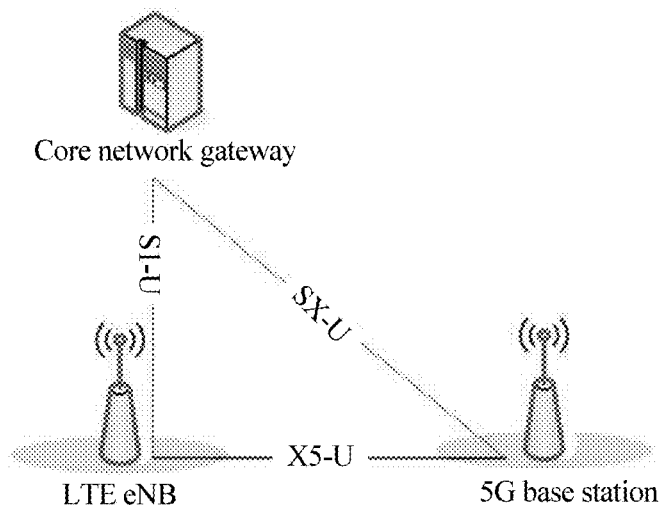
FIG. 10 is a schematic diagram of a user plane connection relationship between network elements in a network architecture shown in FIG. 2.

The terminal uses a dual connectivity mode. Different bearer options have different configurations, and a user plane connection depends on different bearer options. For the network architecture shown in FIG. 2, a user plane connection relationship between network elements is shown in FIG. 10.

For a split bearer (split bearers), an S1 interface is terminated at the LTE eNB, a PDCP data packet is transferred between the LTE eNB and a 5G new radio base station by using an X5 interface, and the X5 interface is an interface between the LTE eNB and the 5G base station.

For a 5G cell group bearer (5GCG bearers), the 5G base station is directly connected to the SGW by using an Sx interface, and the LTE eNB does not participate in user plane data transmission. The Sx interface is an interface between the 5G base station and an LTE core network, and is a newly defined interface in this application.

For the network structure shown in FIG. 1, because there is no interface connection relationship between the 5G base station and the SGW, only a split bearer can be implemented.

Figure 11:
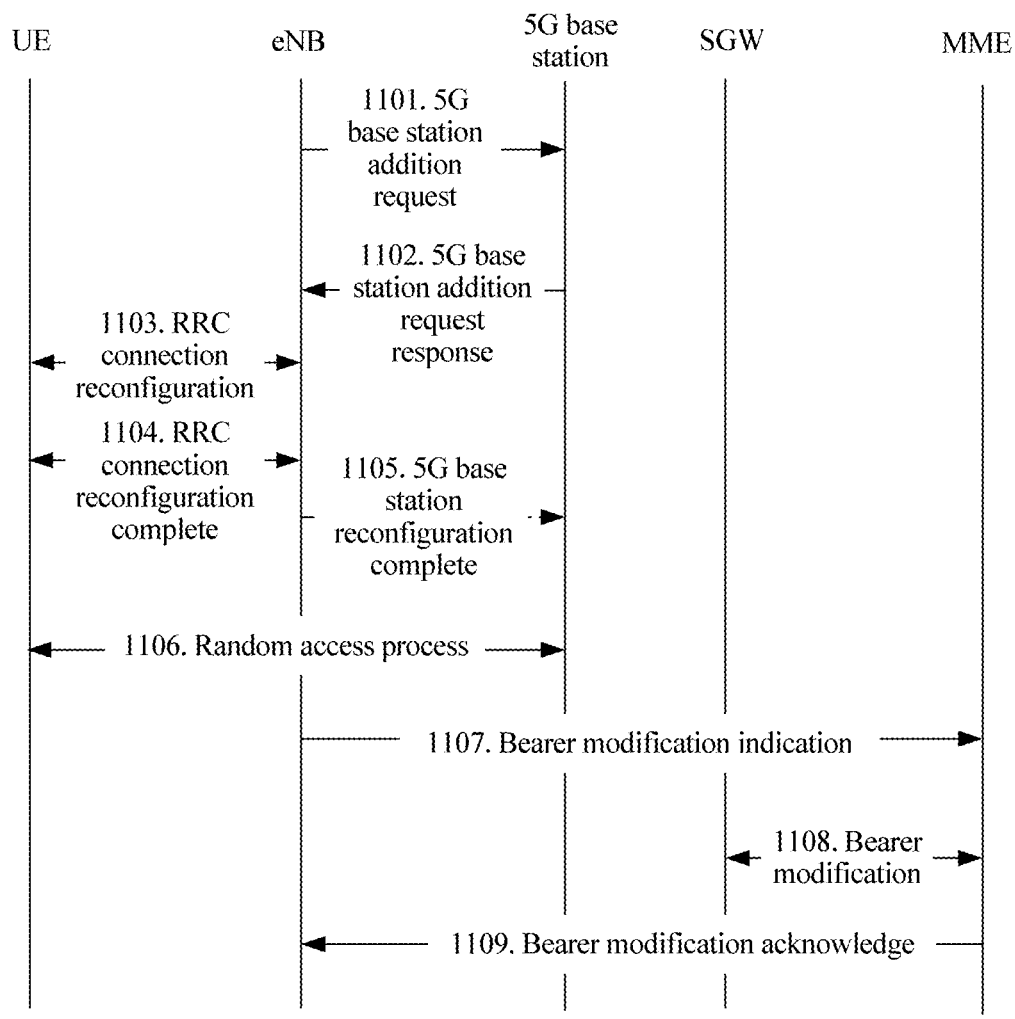
FIG. 11 is a flowchart of a charging method according to Embodiment 2 of the present disclosure.
Figure 12:
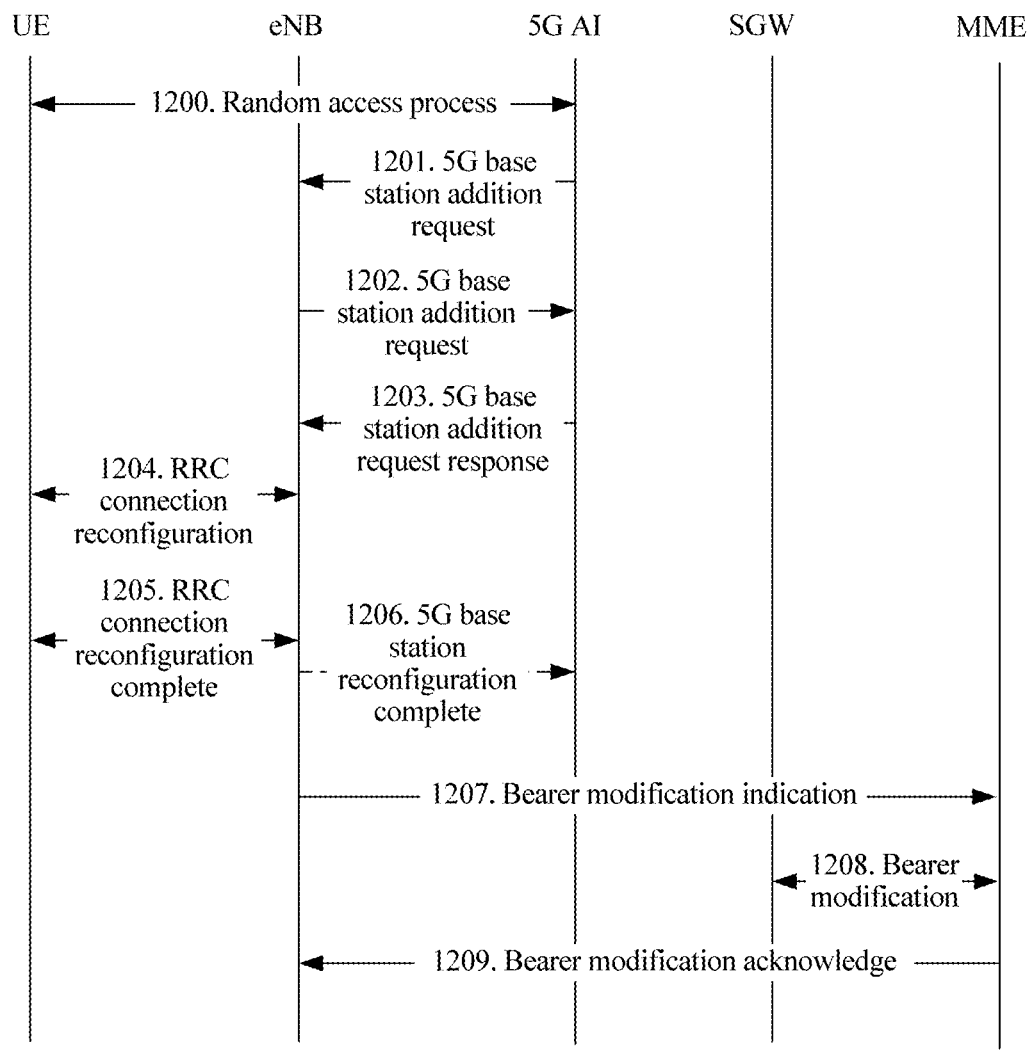
FIG. 12 is a flowchart of another charging method according to Embodiment 2 of the present-disclosure.

Referring to FIG. 11 and FIG. 12, there are two optional implementation solutions for the 5G cell group bearer in a dual connectivity mode.

Specifically, a specific procedure of a solution 1 is shown in FIG. 11.

In block 1101 to block 1106, the LTE eNB determines to add the 5G base station to perform data split.

Details are as follows:

Block 1101: After the UE implements successful access the LTE eNB, the LTE eNB determines to add the 5G base station to perform data split, that is, send a 5G base station addition request (for example, 5G AI addition request) message to the 5G base station.

Block 1102: After receiving the addition request message, the 5G base station returns a 5G base station addition request response (for example, 5G AI addition request ACK) message to the LTE eNB, where the addition request response message may include related configuration information of the 5G base station.

Block 1103: After receiving the addition request response message, the LTE eNB sends an RRC connection reconfiguration (for example, RRC connection reconfiguration) message to the UE, where the RRC connection reconfiguration message includes the related configuration information of the 5G base station.

Block 1104: After receiving the RRC connection reconfiguration message, the UE accepts the related configuration of the 5G base station, and returns an RRC connection reconfiguration complete message to the LTE eNB; and if the UE does not accept the configuration, the UE returns an RRC reconfiguration failure message to the LTE eNB.

Block 1105: After receiving the RRC connection reconfiguration complete message sent by the UE, the LTE eNB returns a 5G base station reconfiguration complete message to the 5G base station. This Block is optional.

Block 1106: The UE performs a random access process to the 5G base station. A sequence of this block, block 1104, and block 1105 is not limited.

Block 1107: For a 5G cell group bearer, the LTE eNB sends a bearer modification indication (eRAB modification indication) message to the LTE MME to notify the MME of a bearer path change, where the bearer modification indication message carries a first indication.

The first indication is used to indicate that a service carried by the UE is a service transferred by using a 5G air interface.

Block 1108: After the MME receives the bearer modification indication message, the MME sends a bearer modification request (for example, bearer modification request) message to the SGW, where the bearer modification request message carries the first indication, and after receiving the bearer modification request message, the SGW returns a bearer modification response (for example, bearer modification response) message to the MME.

In this block, the SGW may perform traffic statistics collection according to the first indication. For example, if the SGW offloads some bearers for data transmission with the UE by using the 5G air interface, the SGW may perform charging on the bearers according to the first indication in a traffic charging manner or a time charging manner.

Specifically, because the SGW can perform only bearer splitting, the charging is performed at per bearer.

Optionally, if the SGW receives a ULI (user location info) information element in the received bearer modification request message (for example, bearer modification request), the SGW needs to send the bearer modification request message (for example, bearer modification request) to the PGW, and the PGW returns the bearer modification response message (for example, bearer modification response) to the SGW. The bearer modification request message needs to carry the first indication, so that the PGW performs, according to the first indication, charging on the service that is carried by the UE and that is transferred by using the 5G air interface.

Specifically, the SGW/PGW may perform, according to the first indication in the bearer modification request message, charging on the service transferred by using the 5G air interface.

Block 1109: The MME returns a bearer modification acknowledge (for example, eRAB modification confirmation) message to the LTE eNB.

Specifically, a specific procedure of a solution 2 is shown in FIG. 12.

Block 1200: The UE accesses the 5G base station by using a 5G air interface, and then accesses an LTE core network through the LTE eNB by using an X5 interface.

Block 1201: The 5G base station requests the LTE eNB to add the 5G base station to perform data split, and sends a 5G base station addition request message to the LTE eNB.

Subsequent blocks are similar to those described in the solution 1. Block 1106 in the solution 1 is excluded because the UE has accessed the 5G base station in block 1200.

Block 1202: After receiving the addition request message sent by the 5G base station, the LTE eNB determines to add the 5G base station to perform data split, and sends a 5G base station addition request message to the 5G base station.

Block 1203: After receiving the addition request message, the 5G base station returns a 5G base station addition request response (for example, 5G AI addition request ACK) message to the LTE eNB, where the addition request response message may include related configuration information of the 5G base station.

Block 1204: After receiving the addition request response message, the LTE eNB sends an RRC connection reconfiguration message to the UE, where the RRC connection reconfiguration message includes the related configuration information of the 5G base station.

Block 1205: After receiving the RRC connection reconfiguration message, the UE accepts the related configuration of the 5G base station, and returns an RRC connection reconfiguration complete message to the LTE eNB; and if the UE does not accept the configuration, the UE returns an RRC reconfiguration failure message to the LTE eNB.

Block 1206: After receiving the RRC connection reconfiguration complete message sent by the UE, the LTE eNB returns a 5G base station reconfiguration complete message to the 5G base station. This Block is optional.

Block 1207: For a 5G cell group bearer, the LTE eNB sends a bearer modification indication message to notify the MME of a bearer path change, where the bearer modification indication message carries a first indication.

Block 1208: After receiving the bearer modification indication message, the MME sends a bearer modification request message to the SGW, where the bearer modification request message carries the first indication, and after receiving the bearer modification request message, the SGW returns a bearer modification response message to the MME.

In this block, the SGW may perform traffic statistics collection according to the first indication. For example, if the SGW offloads some bearers to the 5G base station, the SGW may perform charging on the bearers according to the first indication in a traffic charging manner or a time charging manner.

Specifically, because the SGW can perform only bearer splitting, the charging is performed at per bearer.

Optionally, if the SGW receives a ULI (user location info) information element in the received bearer modification request message (for example, bearer modification request), the SGW needs to send the bearer modification request message (for example, bearer modification request) to the PGW, and the PGW returns the bearer modification response message (for example, bearer modification response) to the SGW. The bearer modification request message needs to carry the first indication, so that the PGW performs, according to the first indication, charging on the service that is carried by the UE and that is transferred by using the 5G air interface.

Specifically, the SGW/PGW may perform, according to the first indication in the bearer modification request message, charging on the service transferred by using the 5G air interface.

Block 1209: The MME returns a bearer modification acknowledge message to the LTE eNB.

For a dual connectivity mode of a split bearer, in the solution 1 or the solution 2, after the UE returns the RRC connection reconfiguration complete message to the LTE eNB, no subsequent block is performed. Traffic statistics collection is directly performed on the LTE eNB. Traffic information is reported to the LTE MME/SGW/PGW after the statistics collection, so that charging is performed on the service that is carried by the UE and that is transferred by using the 5G air interface.

In the foregoing Embodiment 2, in a dual connectivity scenario of the 5G base station and the LTE eNB, the UE sends, to the MME through the LTE eNB, the bearer modification indication message that carries the first indication, and after receiving the bearer modification indication message that carries the first indication, the MME adds the first indication to the bearer modification request message, and sends the bearer modification request message to the gateway in the LTE core network, so that the gateway in the LTE core network completes, according to the first indication, charging on the service that is carried by the UE and that is transferred by using the 5G air interface.

Embodiment 3

An application scenario in Embodiment 3 is applicable to a UE moving scenario. UE is handed over from a source LTE eNB to a target LTE eNB, and the source LTE eNB is performing data split with a 5G base station. In this case, after the UE moves to the target LTE eNB, to ensure data split continuity, the target LTE eNB determines to add the 5G base station in a handover process to continue performing data split, and in the data split process, the target LTE eNB performs charging on a service transferred by using a 5G air interface. Adding the 5G base station to continue the data split process is performed in a handover preparation process. FIG. 1 or FIG. 2 is a network architectural diagram of the application scenario. Network elements in the application scenario include UE, a 5G base station, and an eNB, an MME, and a core network gateway in an LTE network, and the gateway in the LTE core network includes a PGW and an SGW.

The handover includes three phases: a handover preparation phase, a handover execution phase, and a handover completion phase. In the handover completion phase, a message is exchanged with an LTE core network.

Figure 13:
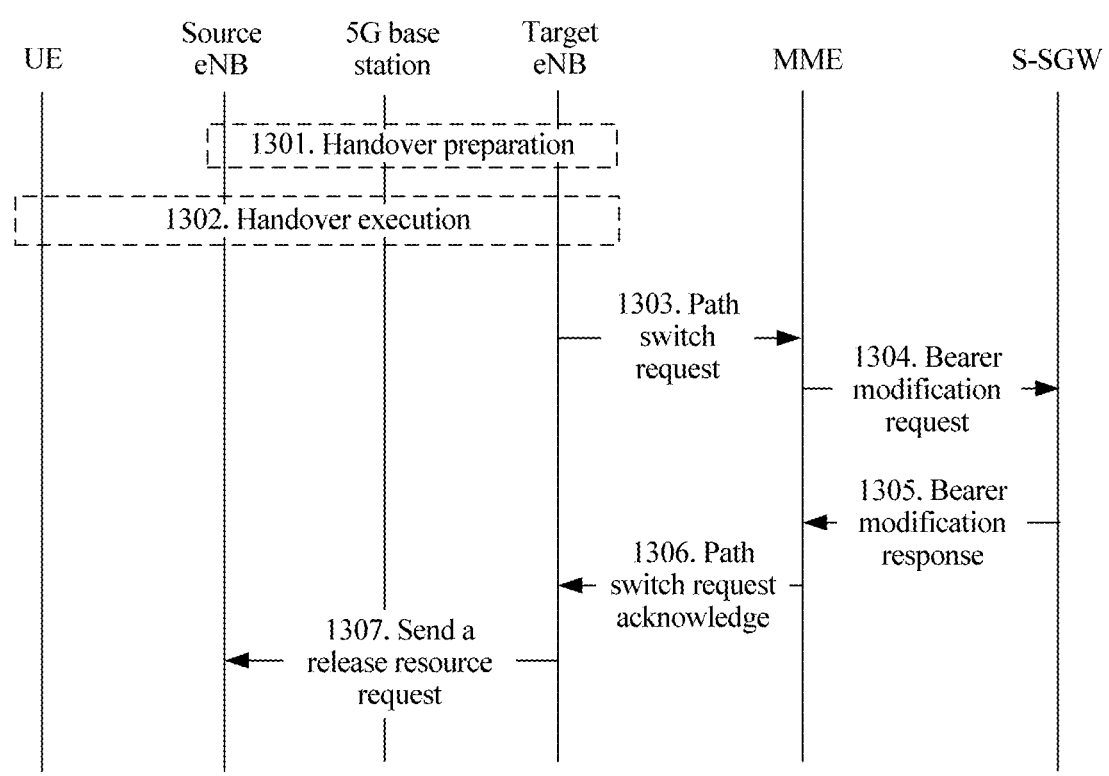
FIG. 13 is a flowchart of a charging method according to Embodiment 3 of the present disclosure.

As shown in FIG. 13, in block 1301 and block 1302, the UE determines to perform handover, and enters the handover preparation phase and the handover execution phase.

In this process, the UE is handed over from the source LTE eNB to the target LTE eNB, and the source LTE eNB is performing data split with the 5G base station. After the UE is handed over to the target LTE eNB, the target LTE eNB determines to add the 5G base station to continue the data split process.

In the handover preparation process, referring to Embodiment 2, the source eNB sends a handover request message to the target eNB, and the target eNB sends an addition request message to the 5G base station. In the handover execution process, for example, the UE performs a random access process to the target LTE eNB and the 5G base station.

For the handover procedure, refer to a related procedure of handover between LTE eNBs with an LTE X2 interface.

Block 1303: After the handover is performed, in the handover completion phase, the target LTE eNB sends a path switch request (for example, path switch request) message to the MME, where the path switch request message is used to notify the MME that a cell of the UE has changed, and the MME determines a specific SGW for continuing serving the UE, and re-allocates an SGW. The path switch request message carries a first indication.

The first indication is used to indicate that a service carried by the UE is a service transferred by using a 5G air interface.

In block 1304 and block 1305, after receiving the path switch message, the MME determines whether to change the SGW.

Optionally, if the SGW does not change, the following block is performed.

Block 1304: The MME sends a bearer modification request (for example, bearer modification request) message to the source SGW/PGW, where the bearer modification request message carries the first indication.

Specifically, the SGW/PGW may perform, according to the first indication in the message, charging on the service transferred by using the 5G air interface.

Block 1305: After a downlink data transmission tunnel of the source SGW is handed over to the target LTE eNB, the SGW sends a bearer modification response (for example, bearer modification response) message to the MME, similar to Embodiment 2.

Optionally, if the source SGW receives a user location (user location info, ULI) information element in the bearer modification request message (for example, bearer modification request), the source SGW needs to send the bearer modification request message (for example, bearer modification request) to the PGW, and the PGW returns the bearer modification response message (for example, bearer modification response) to the SGW.

Block 1306: The MME returns a path switch request acknowledge (for example, path switch request ack) message to the target LTE eNB.

Block 1307: The target LTE eNB sends a release resource request (for example, Release resource) message to the source LTE eNB.

Figure 14:
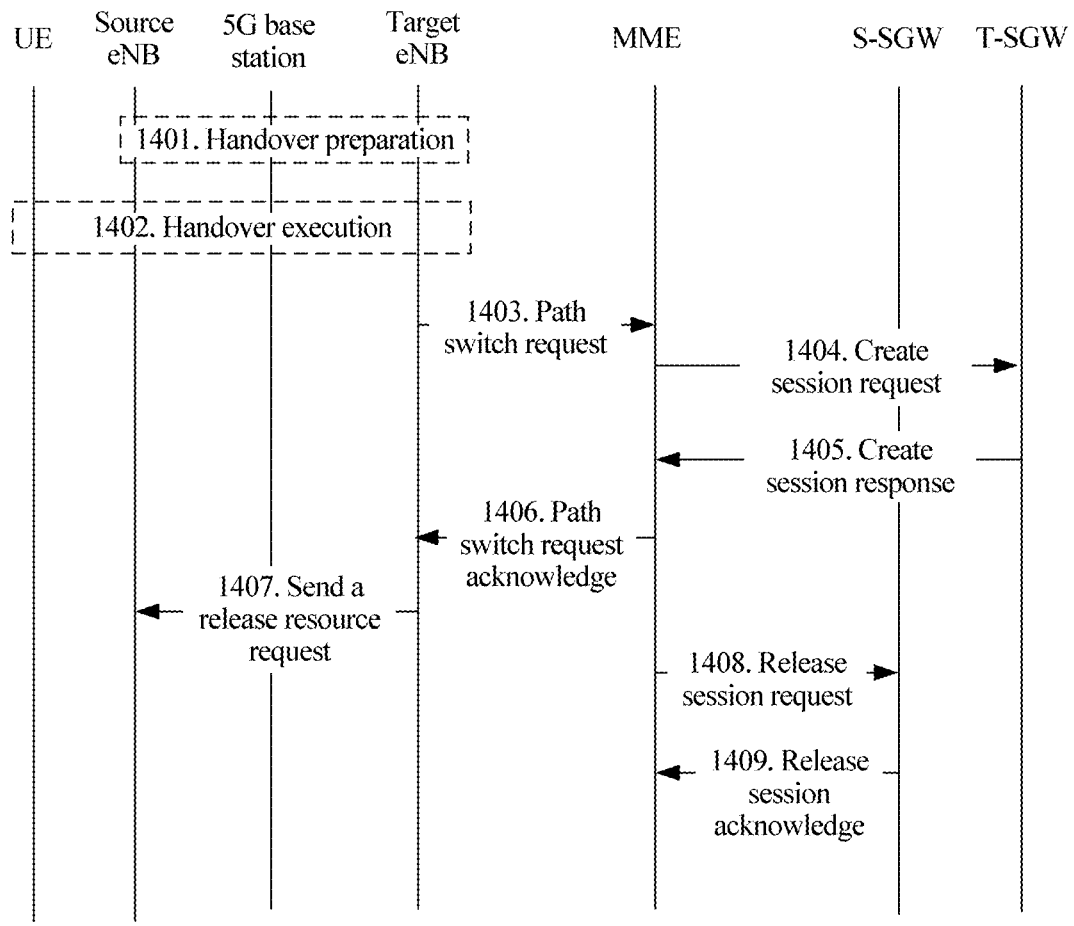
FIG. 14 is a flowchart of another charging method according to Embodiment 3 of the present disclosure.

Optionally, as shown in FIG. 14, if the SGW changes, the following blocks are performed.

Block 1401 to block 1403 are exactly the same as block 1301 to block 1303 in FIG. 13, and details are not described herein again.

Block 1404: The MME reallocates a new SGW, and sends a create session request (for example, create session request) message to the new SGW/PGW, where the create session message carries the first indication.

Block 1405: The SGW/PGW receives the create session request message sent by the MME, and returns a create session response (for example, create session response) message to the MME, similar to Embodiment 1.

Specifically, the SGW/PGW may perform, according to the first indication in the create session request message, charging on the service transferred by using the 5G air interface.

Block 1406: The MME returns a path switch request acknowledge (for example, path switch request ack) message to the target LTE eNB.

Block 1407: The target LTE eNB sends a release resource request (for example, Release resource) message to the source LTE eNB.

Further, FIG. 14 further includes block 1408 and block 1409, that is, the MME sends a release session request message to the source SGW, and receives a release session acknowledge message returned by the source SGW.

In the foregoing Embodiment 3, after the UE is handed over from the source LTE eNB that is performing data split with the 5G base station to the target LTE eNB, to ensure data split continuity, the target LTE eNB determines to add the 5G base station to continue performing data split. The target LTE eNB sends, to the MME, the path switch request message that carries the first indication. After receiving the path switch request message that carries the first indication, the MME adds the first indication to the bearer modification request message or the create session request message and sends the bearer modification request message or the create session request message to the gateway in the LTE core network, so that the gateway in the LTE core network completes, according to the first indication, charging on the service that is carried by the UE and that is transferred by using the 5G air interface.

The foregoing mainly describes the solutions provided in the embodiments of the present disclosure from the perspective of interaction between network elements. It can be understood that, to implement the foregoing functions, each network element such as the first access device, the mobility management entity in the first radio network, or the core network gateway in the first radio network includes corresponding hardware structures and/or software modules for performing various functions. A person skilled in the art should be easily aware that, the units and algorithm blocks in the examples described with reference to the embodiments disclosed in this specification may be implemented by hardware or a combination of hardware and computer software. Whether the functions are performed by hardware or computer software driving hardware depends on particular applications and design constraint conditions of the technical solutions. A person skilled in the art may use different methods to implement the described functions for each particular application, but it should not be considered that the implementation goes beyond the scope of the present disclosure.

Figure 15:
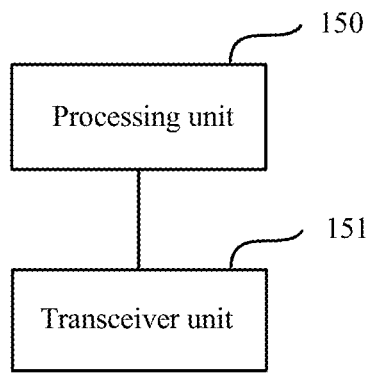
FIG. 15 is a schematic structural diagram of a communications apparatus according to an embodiment of the present disclosure.

FIG. 15 is a schematic structural diagram of a communications apparatus of a network side according to an embodiment of the present disclosure. The apparatus may be configured to perform the method shown in FIG. 4. The communications apparatus may be a base station or an apparatus installed in the base station, or another apparatus that can communicate with the base station.

Referring to FIG. 15, the apparatus includes:

a processing unit 150, configured to determine that a service carried by a user terminal is a service transferred by using a second radio access technology; and a transceiver unit 151, configured to: send, to a mobility management entity in a first radio network, a first message that carries a first indication, and send, to a core network gateway in the first radio network through the mobility management entity, a second message that carries the first indication, where the first indication is used to indicate that the service carried by the user terminal is a service transferred by using the second radio access technology.

Optionally, when determining that the service carried by the user terminal is a service transferred by using the second radio access technology, the processing unit 150 is specifically configured to:

when receiving an attach request message sent by the user terminal by using the second radio access technology, determine that the service carried by the user terminal is a service transferred by using the second radio access technology.

Optionally, when the processing unit 150 determines that the service carried by the user terminal is a service transferred by using the second radio access technology, the transceiver unit 151 is specifically configured to:

receive, through a second access device in a second radio network, a radio resource control RRC connection request message sent by the user terminal, and feed back an RRC connection setup message to the user terminal through the second access device, to complete RRC connection setup of the user terminal, where the second access device is located in the second radio network that uses the second radio access technology, and the network device and the second access device use different radio access technologies.

Optionally, when determining that the service carried by the user terminal is a service transferred by using the second radio access technology, the processing unit 150 is specifically configured to:

when determining to add a second access device to perform data split, send an addition request message to the second access device by using the transceiver unit 151;

receive, by using the transceiver unit 151, an addition request acknowledge message fed back by the second access device, where the addition request acknowledge message carries related configuration information of the second access device;

add the related configuration information of the second access device to an RRC connection reconfiguration message, and send the RRC connection reconfiguration message to the user terminal by using the transceiver unit 151; and after receiving, by using the transceiver unit 151, an RRC connection reconfiguration complete message fed back by the user terminal, determine that the service carried by the user terminal is a service transferred by using the second radio access technology.

Optionally, before the processing unit 150 sends, when determining to add the second access device to perform data split, the addition request message to the second access device by using the transceiver unit 151, the processing unit 150 is further configured to:

determine that the user terminal accesses the first radio network through the first access device; or determine that the user terminal accesses the first radio network through the second access device, and receive, by using the transceiver unit 151, an addition request message sent by the second access device.

Optionally, when determining that the service carried by the user terminal is a service transferred by using the second radio access technology, the processing unit 150 is specifically configured to:

after determining that the user terminal is handed over from a third access device that performs data split with a second access device to the first access device, when determining to continue performing data split through the second access device, send an addition request message to the second access device by using the transceiver unit 151, where the first access device and the third access device use a same radio access technology;

receive, by using the transceiver unit 151, an addition request acknowledge message fed back by the second access device, where the addition request acknowledge message includes related configuration information of the second access device;

add the related configuration information of the second access device to an RRC connection reconfiguration message, and send the RRC connection reconfiguration message to the user terminal by using the transceiver unit 151; and after receiving, by using the transceiver unit 151, an RRC connection reconfiguration complete message fed back by the user terminal, determine that the service carried by the user terminal is a service transferred by using the second radio access technology.

Figure 16:
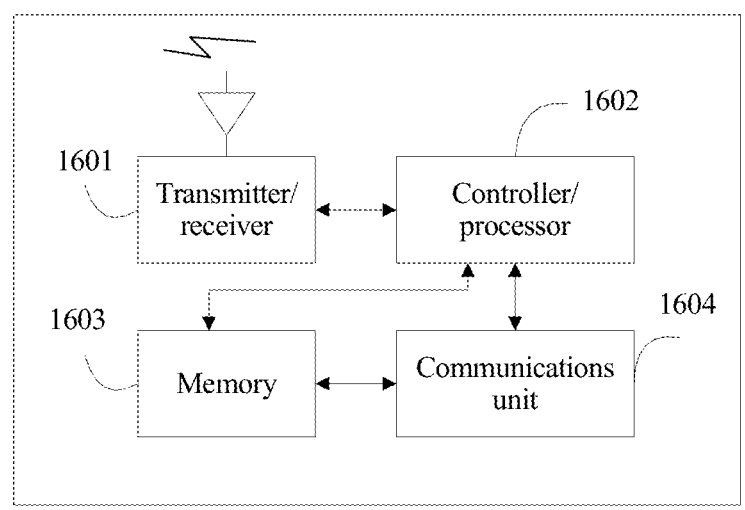
FIG. 16 is a schematic structural diagram of a first access device according to an embodiment of the present disclosure.

FIG. 16 is a possible schematic structural diagram of the first access device in the foregoing embodiments.

The device includes a transmitter/receiver 1601, a controller/processor 1602, a memory 1603, and a communications unit 1604. The transmitter/receiver_1601 is configured to support the device in information receiving and sending with the UE in the foregoing embodiments, and support the UE in performing wireless communication with other UE. The controller/processor 1602 performs various functions for communicating with the UE. In an uplink, an uplink signal from the UE is received by using an antenna, demodulated by the transmitter/receiver 1601, and further processed by the controller/processor 1602, to restore service data and signaling information that are sent by the UE. In a downlink, service data and a signaling message are processed by the controller/processor 1602 and demodulated by the transmitter/receiver 1601 to generate a downlink signal, and the downlink signal is transferred to the UE by using the antenna. The controller/processor 1602 further performs a processing process of the device in FIG. 3 to FIG. 14 and/or another process in the technology described in this application. The memory 1603 is configured to store program code and data of the device. The communications unit 1604 is configured to support the device in communicating with another network entity. For example, the communications unit 1604 is configured to support the device in communicating with another communications network entity shown in FIG. 3, such as an MME, an SGW, and/or a PGW in a core network EPC.

It can be understood that FIG. 16 shows merely a simplified design of the device. In actual application, the device may include any quantity of transmitters, receivers, processors, controllers, memories, communications units, and the like, and all devices that can implement the present disclosure shall fall within the protection scope of the present disclosure.

Figure 17:
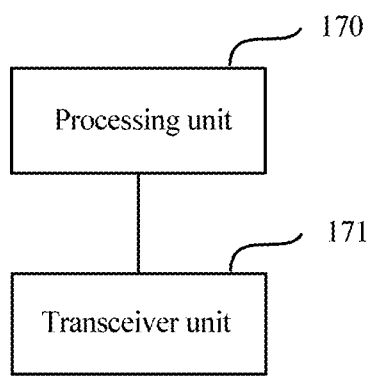
FIG. 17 is a schematic structural diagram of a core network apparatus according to an embodiment of the present disclosure.

FIG. 17 is a schematic structural diagram of a communications apparatus of a network side according to an embodiment of the present disclosure. The apparatus may be configured to perform the method shown in FIG. 5. The communications apparatus may be a mobility management entity or an apparatus installed in the mobility management entity, or another apparatus that can communicate with the mobility management entity.

Referring to FIG. 17, the apparatus includes:

a transceiver unit 171, configured to receive a first message sent by a first access device or a second access device when the first access device or the second access device determines that a service carried by a user terminal is a service transferred by using a second radio access technology, where the second access device is located in a second radio network that uses the second radio access technology, and the first access device and the second access device use different radio access technologies; and a processing unit 170, configured to: when determining that the first message carries a first indication, add the first indication to a second message, and send the second message to a core network gateway in a first radio network by using the transceiver unit 171, where the first indication is used to indicate that the service carried by the user terminal uses the second radio access technology.

Figure 18:
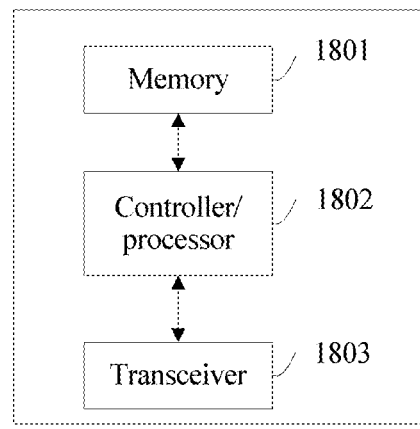
FIG. 18 is a schematic structural diagram of a core network device according to an embodiment of the present disclosure.

FIG. 18 is a block diagram of a structural design of a core network device in the first radio network in the foregoing embodiments, and the core network device may be an MME.

The core network device includes a controller/processor 1802, a memory 1801, and a transceiver 1803. The controller/processor 1802 is configured to: control and manage an action of the core network device, and execute various functions to support a communication service of a UE. For example, the controller/processor 1802 is configured to support the core network device in performing the process in FIG. 5, and/or another process in the technology described in this specification. The memory 1801 is configured to store program code and data for the core network device. The transceiver 1803 is configured to support communication with another network entity, for example, communication with the communications unit 1604 of the first access device in FIG. 16, and for another example, communication with a network entity shown in FIG. 20.

Figure 19:
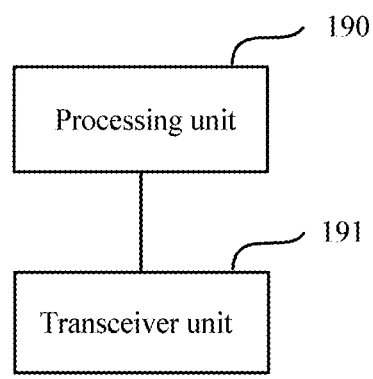
FIG. 19 is a schematic structural diagram of a core network apparatus according to an embodiment of the present disclosure.

FIG. 19 is a schematic structural diagram of a communications apparatus of a network side according to an embodiment of the present disclosure. The apparatus may be configured to perform the method shown in FIG. 5. The communications apparatus may be a core network gateway or an apparatus installed in the core network gateway, or another apparatus that can communicate with the core network gateway.

Referring to FIG. 19, the apparatus includes:

a transceiver unit 191, configured to receive a second message sent by a mobility management entity in a first radio network; and a processing unit 190, configured to: when determining that the second message carries a first indication, perform charging on a service that is sent to a second access device, carried by a user terminal, and transferred by using a second radio access technology, where the first indication is used to indicate that the service carried by the user terminal is a service transferred by using the second radio access technology.

Figure 20:
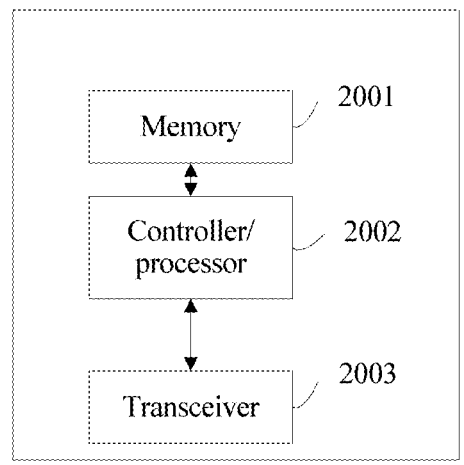
FIG. 20 is a schematic structural diagram of a core network device according to an embodiment of the present disclosure.

FIG. 20 is a block diagram of a structural design of a core network device in the first radio network in the foregoing embodiments, and the core network device may be a core network gateway.

The core network device includes a controller/processor 2002, a memory 2001, and a transceiver 2003. The controller/processor 2002 is configured to: control and manage an action of the core network device, and execute various functions to support a communication service of UE. For example, the controller/processor 2002 is configured to support the core network device in performing the process in FIG. 6, and/or another process in the technology described in this specification. The memory 2001 is configured to store program code and data for the core network device. The transceiver 2003 is configured to support communication with another network entity, for example, communication with the transceiver 1803 of the device in FIG. 18.

The controller/processor for performing functions of the base station, the UE, the first access device, or the core network apparatus in the present disclosure may be a central processing unit (CPU), a general purpose processor, a digital signal processor (DSP), an application-specific integrated circuit (ASIC), a field programmable gate array (FPGA) or another programmable logical device, a transistor logical device, a hardware component, or any combination thereof. The controller/processor may implement or execute various example logical blocks, modules, and circuits that are described with reference to the content disclosed in the present disclosure. The processor may also be a combination of computing functions, for example, a combination of one or more microprocessors or a combination of a DSP and a microprocessor.

In view of the above, in the embodiments of the present disclosure, when determining that the service carried by the user terminal is a service transferred by using the second radio access technology, the first access device in the first radio network sends, to the mobility management entity in the first radio network, the first message that carries the first indication, and sends, to the core network gateway in the first radio network through the mobility management entity, the second message that carries the first indication, where the first indication is used to indicate that the service carried by the user terminal uses the second radio access technology. When determining that the second message carries the first indication, the core network gateway performs charging on the service that is sent to the second access device, carried by the user terminal, and transferred by using the second radio access technology. In this way, a charging function on a service carried by using a new access technology that does not include a core network can be implemented by the core network gateway in the first radio network.

Figure 21:
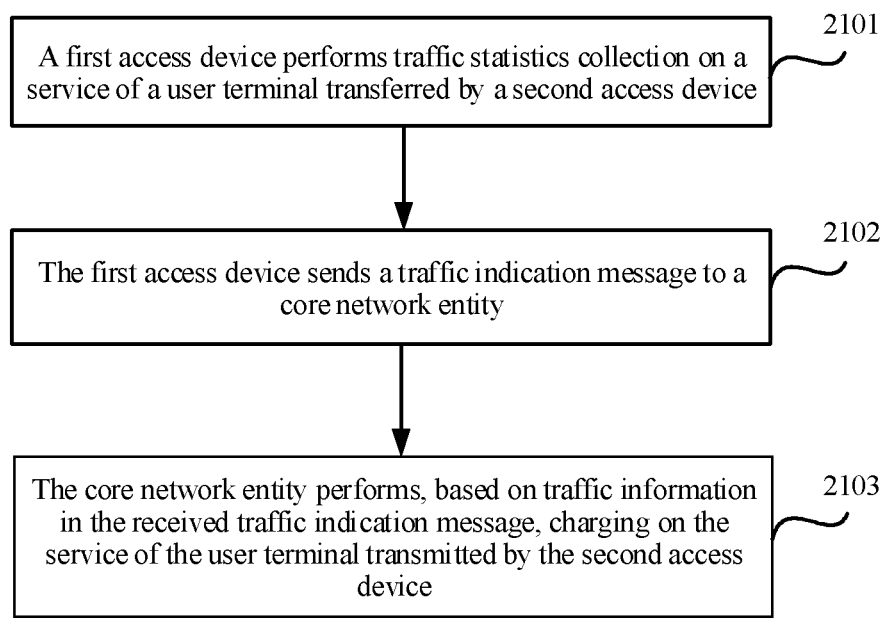
FIG. 21 is a flowchart of another charging method according to an embodiment of the present disclosure.

As shown in FIG. 21, an embodiment of the present disclosure further provides a charging method, including blocks S2101 and S2102.

S2101: A first access device performs traffic statistics collection on a service of a user terminal transferred by a second access device.

Optionally, the first access device and the second access device may use different radio access technologies. For example, in an LTE-WLAN aggregation (LWA) scenario, the first access device is an evolved NodeB (eNodeB/eNB) in an LTE network, and the second access device is a wireless local area network termination (WT) in a WLAN. A communications interface exists between the eNB and the WT, and includes a data plane interface and a control plane interface. The WT manages at least one access point (AP). The WT may perform data split on a service of the user terminal transferred by the eNB, that is, the WT transfers some services of the user terminal to reduce load of the eNB. The eNB may perform traffic statistics collection on a service of the user terminal transferred by the WT. For another example, in an LTE-5G dual connectivity scenario, the first access device may be a base station (eNB) in an LTE network, and the second access device may be a base station device in a 5G network. For detailed description of the LTE-5G dual connectivity scenario, refer to related content in another embodiment of the present disclosure. Details are not described herein again.

Optionally, the first access device and the second access device may use a same radio access technology. For example, in a dual connectivity (DC) scenario, the first access device is a master eNodeB (MeNB, master eNB), and the second access device is a secondary eNodeB (SeNB, secondary eNB). The SeNB may perform data split on a service of the user terminal transferred by the MeNB, that is, the SeNB transfers some services of the user terminal to reduce load of the MeNB. The MeNB may perform traffic statistics collection on a service of the user terminal transferred by the SeNB. The MeNB and the SeNB are base station devices of a same standard, for example, an LTE standard.

Optionally, the service transferred by the second access device may include any one or more of the following:

an Internet Protocol IP header or a TCP/UDP header in a data packet, a TCP (Transmission Control Protocol) control packet, and a retransmitted data packet.

Optionally, performing traffic statistics collection by the first access device may be specifically at per bearer. If the first access device and the second access device support network slicing, statistics collection may be at per bearer of each slice or at per slice of each bearer. Further, if the first access device has a deep packet inspection (DPI) function, the first access device may perceive a specific service, to differentiate different traffic used by different services.

S2102: The first access device sends a traffic indication message to a core network entity, where the traffic indication message includes traffic information of the service, and the traffic information is used for the core network entity to perform charging on the service.

The traffic information may be a traffic statistics value of a service that is offloaded by the first access device to the second access device.

Optionally, in another embodiment of the present disclosure, the first access device may determine to transfer some services of the user terminal to the second access device for transmission, and perform traffic statistics collection on the service transferred to the second access device.

S2103: The core network entity performs, based on the traffic information in the received traffic indication message, charging on the service of the user terminal transferred by the second access device.

Optionally, the core network entity may be an MME and/or an SGW. Optionally, the MME or the SGW may separately perform charging, or the MME and the SGW may cooperate to complete charging.

Optionally, a specific type of the traffic indication message is not specifically limited in this embodiment of the present disclosure. For example, the traffic indication message may be a newly created S1 interface message that is specially used to transmit the traffic information. An S1 interface is an interface between the first access device and the core network entity. Alternatively, the traffic indication message may be an existing message transferred between the first access device and the core network device. For example, in an LWA scenario, the eNB may report the traffic information to the MME by using an existing radio access bearer modification indication (E-UTRAN Radio Access Bearer, ERAB modification indication) message, then the MME reports the traffic information to the SGW by using a bearer modification message, and the SGW completes charging.

Figure 22:
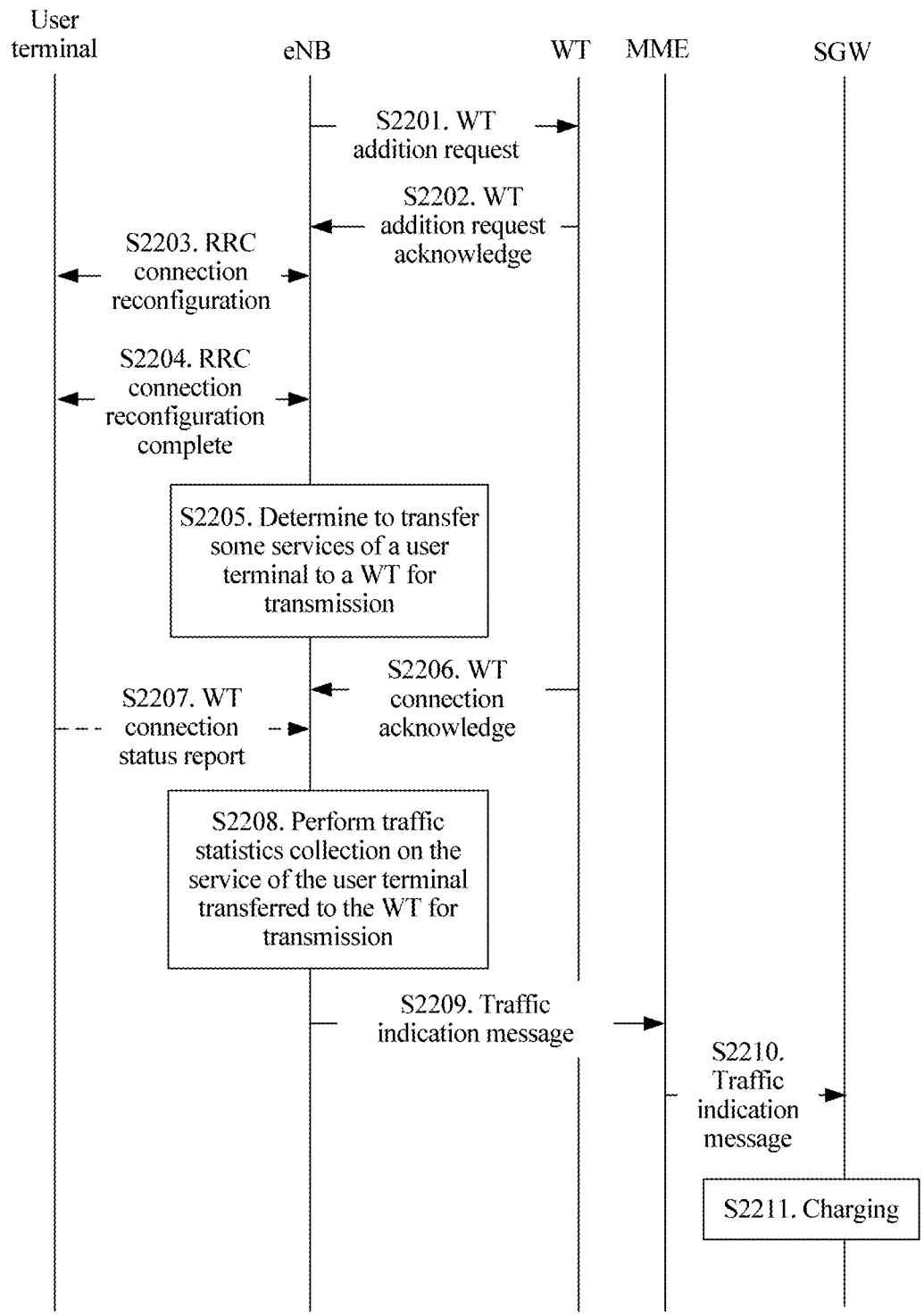
FIG. 22 is a flowchart of still another charging method according to an embodiment of the present disclosure.

FIG. 22 is a schematic signaling flowchart of the charging method provided in the embodiment in FIG. 21. For clear description, an example in which a first access device is an eNB, and a second access device is a WT is used for description. It can be understood that a specific type of an access device is not limited in this embodiment of the present disclosure.

S2201: The eNB sends a WT addition request message to the WT to request the WT to perform data split for the eNB.

S2202: The WT sends a WT addition request acknowledge message to the eNB.

The WT addition request acknowledge message includes related configuration information of the WT, and the configuration information may specifically include bearer information, mobility control information, a mobility set, and the like, and the mobile set may include a list of identifiers of accessible APs.

S2203: The eNB sends an RRC connection reconfiguration message to a user terminal.

The RRC connection reconfiguration message includes the related configuration information of the WT.

S2204: The user terminal sends an RRC connection reconfiguration complete message to the eNB.

After sending the RRC connection reconfiguration complete message, the user terminal may enter an LWA working mode by using the related configuration information of the WT. For example, the user terminal is associated with one of the accessible APs based on the mobile set included in the configuration information in block 2202.

S2205. After receiving the RRC connection reconfiguration complete message fed back by the user terminal, the eNB determines to transfer some services of the user terminal to the WT for transmission.

S2206: The WT sends a WT association acknowledge message to the eNB.

S2207: The user terminal sends a WLAN connection status report to the eNB.

S2207 is an optional block.

S2208: The eNB performs traffic statistics collection on the service of the user terminal transferred to the WT for transmission.

S2209: The eNB sends a traffic indication message to an MME.

S2210: The MME sends the traffic indication message to an SGW.

S2211: The SGW obtains traffic information in the traffic indication message, and performs charging on the service of the user terminal.

For detailed description of the traffic indication message and the traffic information, refer to related description in another embodiment of the present disclosure, for example, the embodiment shown in FIG. 21. Details are not described herein again.

According to the charging method provided in this embodiment of the disclosure, the first access device performs traffic statistics collection on a service that is offloaded to the second access device, and the traffic indication message is used to instruct a core network device to perform charging on such offloaded services, to implement separate charging on the offloaded service, and reduce load of a core network.

Figure 23:
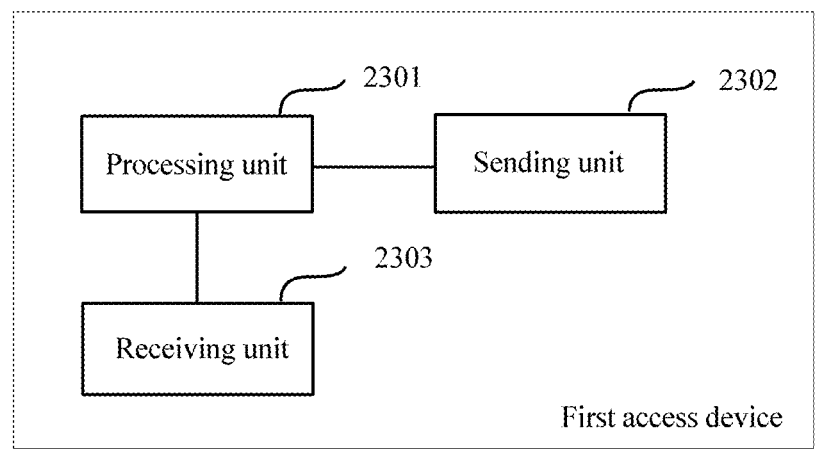
FIG. 23 is a schematic structural diagram of another first access device according to an embodiment of the present disclosure.

FIG. 23 is a schematic structural diagram of a first access device according to an embodiment of the present disclosure. The first access device may be configured to perform related blocks of the first access device in the embodiment shown in FIG. 21 or FIG. 22. Specifically, the first access device may include:

a processing unit 2301, configured to perform traffic statistics collection on a service of a user terminal transferred by a second access device; and a sending unit 2302, configured to send a traffic indication message to a core network entity, where the traffic indication message includes traffic information of the service, and the traffic information is used for the core network entity to perform charging on the service.

A type of the first access device and a type of the second access device are not specifically limited in this embodiment of the present disclosure. For example, in an LWA scenario, the first access device may be an eNB in an LTE network, and the second access device is a WT in a WLAN. In a DC scenario, the first access device may be an MeNB, and the second access device may be an SeNB; or in an LTE-5G dual connectivity scenario, the first access device is an eNB, and the second access device is a 5G base station device. For detailed description, refer to related content in another embodiment of the present disclosure, for example, the embodiment shown in FIG. 21. Details are not described herein again.

Optionally, the processing unit 2301 may be specifically configured to: determine to transfer some services of the user terminal to the second access device for transmission, and perform traffic statistics collection on the service transferred to the second access device.

Optionally, in another embodiment of the present disclosure, the first access device may further include a receiving unit 2303. It can be understood that a function of the receiving unit 2303 and a function of the sending unit 2302_may be implemented by a transceiver unit.

In this embodiment, the sending unit 2302 is specifically configured to send an addition request message to the second access device, where the addition request message is used to indicate that the first access device determines to transfer a service to the second access device.

The receiving unit 2303 is configured to receive an addition request acknowledge message fed back by the second access device, where the addition request acknowledge message includes related configuration information of the second access device.

The sending unit 2302 is further configured to send a radio resource control (RRC) connection reconfiguration message to the user terminal, where the RRC connection reconfiguration message includes the related configuration information of the second access device.

The receiving unit 2303 is further configured to receive an RRC connection reconfiguration complete message fed back by the user terminal.

The processing unit 2301 is further configured to transfer, based on the RRC connection reconfiguration complete message, some services of the user terminal to the second access device for transmission.

In another embodiment of the present disclosure, in hardware implementation, a receiver may perform the function of the receiving unit 2302, and a transmitter may perform the function of the sending unit 2303, or the function of the receiving unit 2302 and the function of the sending unit 2303 may be implemented by a transceiver or a communications module. The processing unit 2301 may be built in or independent of a processor of a base station in a hardware form, or may be stored in a memory of the base station in a software form, so that the processor invokes the processing unit 2301 to perform an operation corresponding to each of the foregoing modules.

Figure 24:
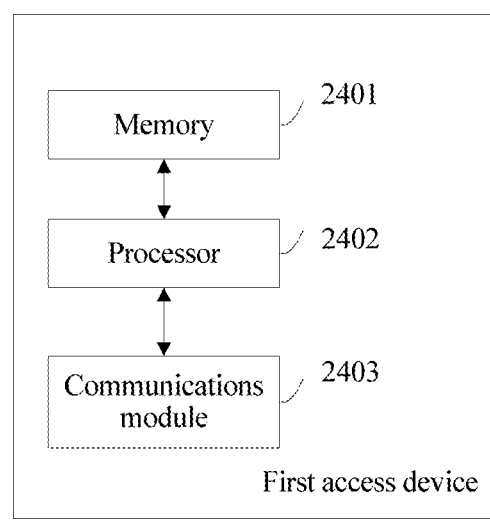
FIG. 24 is a schematic structural diagram of still another first access device according to an embodiment of the present disclosure.

FIG. 24 is a simplified schematic diagram of a possible design structure of the first access device in the foregoing embodiments.

The first access device includes a processor 2402, a memory 2401, and a communications module 2403. The processor 2402 is configured to: control and manage an action of a control device, and perform various functions to support a communication service provided by the first access device. For example, the processor 1202 is configured to support the control device in performing an operation performed by the first access device in FIG. 21 and FIG. 22, and/or another process in the technology described in this specification. The memory 2401 is configured to store program code and data for the apparatus. The communications module 2403 is configured to support communication with another network entity, for example, communication with a second access network device or a core network entity.

It can be understood that FIG. 24 shows merely a simplified design of the control device. In actual application, the control device may include any quantity of transmitters, receivers, processors, controllers, memories, communication modules, and the like. Details are not described herein.

Figure 25:
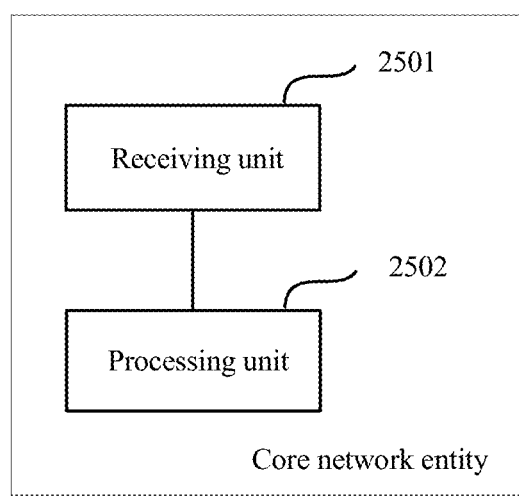
FIG. 25 is a schematic structural diagram of another core network entity according to an embodiment of the present disclosure.

FIG. 25 is a schematic structural diagram of a core network entity according to an embodiment of the present disclosure. The core network entity may be configured to perform related blocks of the core network entity in the embodiment shown in FIG. 21 or FIG. 22. Specifically, the core network entity may specifically include:

a receiving unit 2501, configured to receive a traffic indication message of a first access device, where the traffic indication message includes traffic information of a service of a user terminal transferred by a second access device; and a processing unit 2502, configured to perform charging on the service based on the traffic information.

Optionally, the core network entity may be an MME and/or an SGW.

In another embodiment of the present disclosure, in hardware implementation, a receiver or a communications module may perform a function of the receiving unit 2501. The processing unit 2502 may be built in or independent of a processor of a base station in a hardware form, or may be stored in a memory of the base station in a software form, so that the processor invoke the processing unit 2501 to perform an operation corresponding to each of the foregoing modules.

For detailed description of the first access device and the core network entity provided in this embodiment of the present disclosure, refer to related content in other embodiments of the present disclosure, for example, related description of the embodiments shown in FIG. 21 and FIG. 22. Details are not described herein again.

According to the first access device and the core network entity provided in this embodiment of the present disclosure, the first access device performs traffic statistics collection on a service that is offloaded to the second access device, and the traffic indication message is used to instruct the core network device to perform charging on such offloaded services, to implement separate charging on the offloaded service, and reduce load of a core network.

Figure 26:
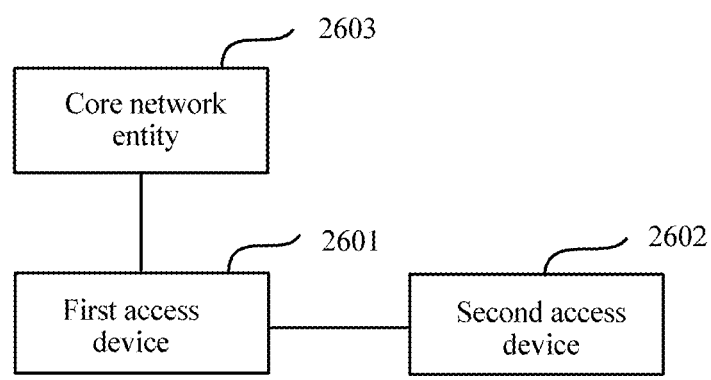
FIG. 26 is a schematic diagram of a communications system according to an embodiment of the present disclosure.

FIG. 26 is a schematic diagram of a communications system according to an embodiment of the present disclosure. The communications system includes a first access device 2601, a second access device 2602, and a core network entity 2603. The first access device 2601 may communicate with the core network entity 2603 by using an S1 interface, and the first access device 2601 and the second access device 2602 may directly or indirectly communicate with each other.

The first access device 2601 is configured to: perform traffic statistics collection on a service of a user terminal transferred by the second access device 2602, and send a traffic indication message to the core network entity 2603, where the traffic indication message includes traffic information of the service.

The core network entity 2602 is configured to perform charging on the service based on the traffic information.

The first access device 2601 may be the first access device shown in FIG. 23 or FIG. 24, and the core network entity may be the core network entity shown in FIG. 25. Details are not described herein again.

According to the communications system provided in this embodiment of the present disclosure, the first access device performs traffic statistics collection on a service that is offloaded to the second access device, and the traffic indication message is used to instruct the core network device to perform charging on such offloaded services, to implement separate charging on the offloaded service, and reduce load of a core network.

A person of ordinary skill in the art may understand that all or a part of the blocks in each of the foregoing methods of the embodiments may be implemented by a program instructing a processor. The foregoing program may be stored in a computer readable storage medium. The storage medium may be a non-transitory medium, such as a random access memory, a read-only memory, a flash memory, a hard disk, a solid-state drive, a magnetic tape, a floppy disk, an optical disc, or any combination thereof.

The present disclosure is described with reference to the flowcharts and/or block diagrams of the method and the device according to the embodiments of the present disclosure. It should be understood that computer program instructions may be used to implement each process and each block in the flowcharts and the block diagrams and a combination of a process and a block in the flowcharts and the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and in one or more blocks in the block diagrams.

The foregoing descriptions are merely examples of embodiments of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A charging method, comprising:
    performing, by a first access device, traffic statistics collection on a service of a user terminal transferred by a second access device; and
    sending, by the first access device, a traffic indication message to a core network entity, wherein the traffic indication message comprises traffic information of the service, the service of the user terminal comprising data of a user terminal bearer, the bearer being a split bearer, and the traffic information is used for the core network entity to perform charging on the service,
    wherein the performing, by the first access device, traffic statistics collection on a service of the user terminal transferred by the second access device comprises:
        splitting, by the first access device, the data of the bearer of the user terminal to the second access device for transmission; and
        performing, by the first access device, traffic statistics collection on data split to the second access device, splitting, by the first access device, the data of the bearer of the user terminal to the second access device for transmission comprises:
sending, by the first access device, an addition request message to the second access device, wherein the addition request message is used to indicate that the first access device has determined to split data of the service to the second access device;
receiving, by the first access device, an addition request acknowledge message fed back by the second access device, wherein the addition request acknowledge message comprises related configuration information of the second access device;
sending, by the first access device, a radio resource control (RRC) connection reconfiguration message to the user terminal, wherein the RRC connection reconfiguration message comprises the related configuration information of the second access device; and
after receiving an RRC connection reconfiguration complete message fed back by the user terminal, splitting, by the first access device, the data of the service of the user terminal to the second access network for transmission.

2. The method according to claim 1, further comprising: sending, by the first access device, a first indication to the core network entity, wherein the first indication is used to indicate the data split to the second access device is transferred via the second access device.

3. The method according to claim 1, wherein the first access device is a master base station, and the second access device is a secondary base station.

4. The method according to claim 1, wherein the traffic statistics collection is performed on a per bearer basis.

5. A first access device, comprising: a processor, configured to perform traffic statistics collection on a service of a user terminal transferred by a second access device; and send, through a first communications interface, a traffic indication message to a core network entity, wherein the traffic indication message comprises traffic information of the service, the traffic information being used by the core network entity to perform charging on the service, the service comprising data of a bearer of the user terminal, the bearer being a split bearer, the processor being configured to: split the data of the bearer of the user terminal to the second access device for transmission; and perform traffic statistics collection on data split to the second access device, the first access device further comprising a second communications interface and a transceiver; the processor being further configured to: send, through the second communications interface, an addition request message to the second access device, the addition request message being used to indicate that the first access device has determined to transfer a service to the second access device; receive, through the second communications interface, an addition request acknowledge message fed back by the second access device, wherein the addition request acknowledge message comprises related configuration information of the second access device; the transceiver being configured to: send a radio resource control (RRC) connection reconfiguration message to the user terminal, the RRC connection reconfiguration message comprising related configuration information of the second access device; receive an RRC connection reconfiguration complete message fed back by the user terminal; and the processor is configured to determine to split, based on the RRC connection reconfiguration complete message, the data of the service of the user terminal to the second access device for transmission.

6. The device according to claim 5, wherein the second communications interface is further configured to send a first indication to the core network entity, wherein the first indication is used to indicate the data split to the second access device is transferred via the second access device.

7. The device according to claim 5, wherein the traffic statistics collection is performed on a per bearer basis.

8. The device according to claim 5, wherein the device is a master base station in dual connectivity.

9. A charging method for use in a communications system comprising a first access device, a second access device, and a core network entity, the method comprising: sending, by the first access device an addition request message to the second access device, wherein the addition request message is used to indicate that the first access device has determined to split data of a service of a terminal device to the second access device, the service of the user terminal comprising data of a user terminal bearer, the bearer being a split bearer; receiving, by the second access device, the addition request message: sending, by the second access device to the first access device, an addition request acknowledge message fed back by the second access device, wherein the addition request acknowledge message comprises related configuration information of the second access device: receiving, by the first access device, the addition request acknowledge message: sending, by the first access device, a radio resource control (RRC) connection reconfiguration message to the user terminal, wherein the RRC connection reconfiguration message comprises the related configuration information of the second access device: after receiving an RRC connection reconfiguration complete message fed back by the user terminal, splitting, by the first access device, the data of the service of the user terminal to the second access network for transmission: performing, by the first access device, traffic statistics collection on data split to the second access device; sending, by the first access device, a traffic indication message to the core network entity, the traffic indication message comprising traffic information of the data split to the second access device; and performing, by the core network entity, charging on the data split to the second access device based on the traffic information.

10. The method according to claim 9, further comprising:
sending, by the first access device to the core network entity, a first indication indicating the data split to the second base station is transferred via the second access device.

11. The method according to claim 9, wherein the first access device is a master base station, and the second access device is a secondary base station.

12. The method according to claim 9, wherein the traffic statistics collection is performed based on a per bearer basis.

* * * * *